(12) United States Patent  
Buxton et al.

(10) Patent No.: US 9,223,471 B2
(45) Date of Patent: Dec. 29, 2015

(54) TOUCH SCREEN CONTROL

(75) Inventors: William A. S. Buxton, Redmond, WA (US); Michel Pahud, Kirkland, WA (US); Kenneth P. Hinckley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 12/979,386

(22) Filed: Dec. 28, 2010

(65) Prior Publication Data
US 2012/0162093 A1 Jun. 28, 2012

(51) Int. Cl.
G06F 3/0482 (2013.01)
G06F 3/0488 (2013.01)

(52) U.S. Cl.
CPC .......... *G06F 3/0482* (2013.01); *G06F 3/04883* (2013.01); *G06F 2203/04804* (2013.01)

(58) Field of Classification Search
CPC . G06F 3/0482; G06F 3/04845; G06F 3/0486; G06F 3/04886; G06F 3/0481; G06F 3/04817; G06F 3/04842; G06F 3/04883; G06F 2203/04804
USPC .......... 345/173; 715/700, 800, 810, 815, 828, 715/825
See application file for complete search history.

(56) References Cited

U.S. PATENT DOCUMENTS

| | | |
|---|---|---|
| 5,169,342 A | 12/1992 | Steele et al. |
| 5,252,951 A | 10/1993 | Tannenbaum et al. |
| 5,347,295 A | 9/1994 | Agulnick et al. |
| 5,390,281 A | 2/1995 | Luciw et al. |
| 5,500,935 A | 3/1996 | Moran et al. |
| 5,502,803 A | 3/1996 | Yoshida et al. |
| 5,509,114 A | 4/1996 | Moran et al. |
| 5,509,224 A | 4/1996 | Roy |
| 5,523,775 A | 6/1996 | Capps |
| 5,570,113 A | 10/1996 | Zetts |
| 5,581,670 A | 12/1996 | Bier et al. |
| 5,600,765 A | 2/1997 | Ando et al. |
| 5,666,438 A | 9/1997 | Beernink et al. |
| 5,689,667 A * | 11/1997 | Kurtenbach .................. 715/810 |
| 5,796,406 A | 8/1998 | Shigematsu et al. |

(Continued)

OTHER PUBLICATIONS

Hinckley, et al., "Manual Deskterity : An Exploration of Simultaneous Pen + Touch Direct Input", Retrieved at <<http://research.microsoft.com/en-us/um/people/awilson/publications/HinckleyCHI2010/Hinckley%20alt.chi%202010%20pen%20and%20touch.pdf>>, CHI Conference on Human Factors in Computing Systems, Apr. 10-15, 2010, pp. 10.

(Continued)

*Primary Examiner* — Matthew Fry
(74) *Attorney, Agent, or Firm* — Alin Corie; Sandy Swain; Micky Minhas

(57) ABSTRACT

This document relates to touch screen controls. For instance, the touch screen controls can allow a user to control a computing device by engaging a touch screen associated with the computing device. One implementation can receive at least one tactile contact from a region of a touch screen. This implementation can present a first command functionality on the touch screen proximate the region for a predefined time. It can await user engagement of the first command functionality. Lacking user engagement within the predefined time, the implementation can remove the first command functionality and offer a second command functionality.

20 Claims, 18 Drawing Sheets

(56) References Cited

U.S. PATENT DOCUMENTS

| | | | |
|---|---|---|---|
| 5,798,752 A | 8/1998 | Buxton et al. | |
| 5,802,388 A | 9/1998 | Zetts et al. | |
| 5,809,267 A | 9/1998 | Moran et al. | |
| 5,943,039 A | 8/1999 | Anderson et al. | |
| 6,061,054 A | 5/2000 | Jolly | |
| 6,212,296 B1 | 4/2001 | Stork et al. | |
| 6,232,957 B1* | 5/2001 | Hinckley | 345/156 |
| 6,249,606 B1 | 6/2001 | Kiraly et al. | |
| 6,317,128 B1 | 11/2001 | Harrison et al. | |
| 6,333,753 B1* | 12/2001 | Hinckley | 715/768 |
| 6,348,936 B1 | 2/2002 | Berteig | |
| 6,486,874 B1 | 11/2002 | Muthuswamy et al. | |
| 6,492,981 B1 | 12/2002 | Stork et al. | |
| 6,525,749 B1 | 2/2003 | Moran et al. | |
| 6,573,883 B1 | 6/2003 | Bartlett | |
| 6,664,991 B1 | 12/2003 | Chew et al. | |
| 6,674,425 B1 | 1/2004 | Louis et al. | |
| 6,986,106 B2 | 1/2006 | Soin et al. | |
| 6,990,480 B1 | 1/2006 | Burt | |
| 7,006,080 B2 | 2/2006 | Gettemy | |
| 7,017,124 B2 | 3/2006 | Jaeger | |
| 7,055,110 B2 | 5/2006 | Kupta | |
| 7,058,649 B2 | 6/2006 | Ough et al. | |
| 7,120,859 B2 | 10/2006 | Wettach | |
| 7,123,244 B2 | 10/2006 | Lui | |
| 7,203,903 B1 | 4/2007 | Thompson et al. | |
| 7,216,588 B2 | 5/2007 | Suess | |
| 7,268,774 B2 | 9/2007 | Pittel et al. | |
| 7,269,531 B2 | 9/2007 | Brouhon | |
| 7,270,266 B2 | 9/2007 | Silverbrook et al. | |
| 7,283,126 B2 | 10/2007 | Leung | |
| 7,365,736 B2 | 4/2008 | Marvit et al. | |
| 7,454,717 B2 | 11/2008 | Hinckley et al. | |
| 7,479,949 B2 | 1/2009 | Jobs et al. | |
| 7,483,018 B2 | 1/2009 | Oliver | |
| 7,506,271 B2 | 3/2009 | Wang et al. | |
| 7,603,633 B2 | 10/2009 | Zhao et al. | |
| 7,627,810 B2 | 12/2009 | Glazer et al. | |
| 2002/0015064 A1 | 2/2002 | Robotham et al. | |
| 2003/0007018 A1 | 1/2003 | Seni et al. | |
| 2003/0156145 A1 | 8/2003 | Hullender et al. | |
| 2003/0231167 A1 | 12/2003 | Leung | |
| 2004/0001627 A1 | 1/2004 | Simmons et al. | |
| 2004/0041798 A1 | 3/2004 | Kim | |
| 2004/0135776 A1 | 7/2004 | Brouhon | |
| 2004/0155870 A1 | 8/2004 | Middleton | |
| 2005/0083300 A1 | 4/2005 | Castle | |
| 2005/0093868 A1 | 5/2005 | Hinckley | |
| 2005/0144574 A1 | 6/2005 | Chang | |
| 2005/0146508 A1 | 7/2005 | Kirkland et al. | |
| 2005/0193351 A1* | 9/2005 | Huoviala | 715/815 |
| 2005/0198593 A1 | 9/2005 | Keely et al. | |
| 2005/0212751 A1 | 9/2005 | Marvit et al. | |
| 2006/0012562 A1 | 1/2006 | Pope et al. | |
| 2006/0026535 A1 | 2/2006 | Hotelling et al. | |
| 2006/0085767 A1 | 4/2006 | Hinckley et al. | |
| 2006/0161848 A1* | 7/2006 | Stabb et al. | 715/741 |
| 2006/0242607 A1 | 10/2006 | Hudson | |
| 2006/0244738 A1 | 11/2006 | Nishimura et al. | |
| 2006/0267966 A1 | 11/2006 | Grossman et al. | |
| 2006/0267967 A1 | 11/2006 | Hinckley et al. | |
| 2006/0274944 A1 | 12/2006 | Tanaka et al. | |
| 2007/0061743 A1* | 3/2007 | Golbandi | 715/763 |
| 2007/0168873 A1* | 7/2007 | Lentz | 715/763 |
| 2008/0152202 A1 | 6/2008 | Moise et al. | |
| 2008/0204429 A1 | 8/2008 | Silverbrook et al. | |
| 2008/0313565 A1* | 12/2008 | Albertson | 715/825 |
| 2009/0303231 A1 | 12/2009 | Robinet et al. | |
| 2010/0124946 A1* | 5/2010 | Chun | 455/566 |
| 2010/0156656 A1 | 6/2010 | Duarte et al. | |
| 2011/0024492 A1* | 2/2011 | Silverbrook et al. | 235/375 |
| 2011/0055760 A1* | 3/2011 | Drayton et al. | 715/834 |
| 2011/0074710 A1* | 3/2011 | Weeldreyer et al. | 345/173 |
| 2011/0185321 A1* | 7/2011 | Capela et al. | 715/863 |
| 2012/0030569 A1* | 2/2012 | Migos et al. | 715/702 |
| 2012/0030624 A1* | 2/2012 | Migos | 715/830 |
| 2013/0346923 A1* | 12/2013 | KU et al. | 715/835 |

OTHER PUBLICATIONS

Fitzmaurice, et al., "PieCursor: Merging Pointing and Command Selection for Rapid In-place Tool Switching", Retrieved at << http://www.piecursor.com/PieCursor.pdf >>, CHI Conference on Human Factors in Computing Systems, Apr. 5-10, 2008, pp. 1361-1370.

Butkiewicz, et al., "Hierarchical multi-touch selection techniques for collaborative geospatial analysis", Retrieved at << http://www.viscenter.uncc.edu/~rchang/publications/2009/SPIE_selection_final_draft.pdf >>, SPIE (Defense & Security Conference 200), vol. 2346, 2009, pp. 9.

Malik, Shahzad., "An Exploration of Multi-finger Interaction on Multi-touch Surfaces", Retrieved at << http://www.cs.toronto.edu/~smalik/downloads/malik_2007_thesis_multi_finger_final.pdf>>, 2007, pp. 184.

"Synaptics Gesture Suite™ for TouchPads", Retrieved at <<http://www.synaptics.com/solutions/technology/gestures/touchpad>>, Retrieved Date: Jul. 8, 2010, pp. 5.

Non-Final Office Action mailed Nov. 18, 2008 from U.S. Appl. No. 11/282,404, 12 pages.

Miscellaneous Incoming Letter mailed Jan. 13, 2009 from U.S. Appl. No. 11/282,404, 9 pages.

Examiner Interview Summary Record mailed Feb. 10, 2009 from U.S. Appl. No. 11/282,404, 2 pages.

Response filed Feb. 18, 2009 to Non-Final Office Action mailed Nov. 18, 2008 from U.S. Appl. No. 11/282,404, 15 pages.

Non-Final Office Action mailed May 22, 2009 from U.S. Appl. No. 11/282,404, 20 pages.

Response filed Aug. 24, 2009 to Non-Final Office Action mailed May 22, 2009 from U.S. Appl. No. 11/282,404, 14 pages.

Final Office Action mailed Nov. 3, 2009 from U.S. Appl. No. 11/282,404, 17 pages.

Examiner Interview Summary Record mailed Dec. 8, 2009 from U.S. Appl. No. 11/282,404, 3 pages.

Response filed Feb. 3, 2010 to Final Office Action mailed Nov. 3, 2009 from U.S. Appl. No. 11/282,404, 12 pages.

Non-Final Office Action mailed Apr. 16, 2010 from U.S. Appl. No. 11/282,404, 20 pages.

Response filed Apr. 30, 2010 to Non-Final Office Action mailed Apr. 16, 2010 from U.S. Appl. No. 11/282,404, 16 pages.

Final Office Action mailed May 26, 2010 from U.S. Appl. No. 11/282,404, 20 pages.

Response filed Aug. 13, 2010 to Final Office Action mailed May 26, 2010 from U.S. Appl. No. 11/282,404, 14 pages.

Non-Final Office Action mailed Oct. 29, 2010 from U.S. Appl. No. 11/282,404, 20 pages.

Response filed Dec. 30, 2010 to Non-Final Office Action mailed Oct. 29, 2010 from U.S. Appl. No. 11/282,404, 14 pages.

Final Office Action mailed Mar. 18, 2011 from U.S. Appl. No. 11/282,404, 21 pages.

Response filed Apr. 29, 2011 to Final Office Action mailed Mar. 18, 2011 from U.S. Appl. No. 11/282,404, 17 pages.

Non-Final Office Action mailed Jul. 19, 2011 from U.S. Appl. No. 11/282,404, 25 pages.

Response filed Oct. 18, 2011 to Non-Final Office Action mailed Jul. 19, 2011 from U.S. Appl. No. 11/282,404, 19 pages.

Final Office Action mailed Dec. 2, 2011 from U.S. Appl. No. 11/282,404, 26 pages.

Response filed Mar. 25, 2008 to the Non-Final Office Action mailed Jan. 7, 2008 from U.S. Appl. No. 11/332,104, 14 pages.

Non-Final Office Action mailed Jan. 7, 2008 from U.S. Appl. No. 11/332,104, 13 pages.

Notice of Allowance mailed Jul. 27, 2009 from U.S. Appl. No. 11/332,104, 5 pages.

Examiner Interview Summary Record mailed Mar. 31, 2009 from U.S. Appl. No. 11/332,104, 22 pages.

Non-Final Office Action mailed Dec. 31, 2008 from U.S. Appl. No. 11/332,104, 20 pages.

(56) References Cited

OTHER PUBLICATIONS

Response filed Sep. 24, 2008 from U.S. Appl. No. 11/332,104, 16 pages.
Advisory Action mailed Aug. 21, 2008 from U.S. Appl. No. 11/332,104, 3 pages.
Response filed Jul. 31, 2008 to the Final Office Action mailed Jun. 24, 2008 from U.S. Appl. No. 11/332,104, 14 pages.
Final Office Action mailed Jun. 24, 2008 from U.S. Appl. No. 11/332,104, 20 pages.
Examiner Interview Summary Record mailed Apr. 2, 2008 from U.S. Appl. No. 11/332,104, 2 pages.
Accot et al., "More than dotting the i's—Foundations for crossing-based interfaces," ACM CHI 2002, Apr. 20-25, 2002, Minneapolis, Minnesota, pp. 73-80, 8 pages.
Apitz et al., "CrossY: A crossing based drawing application," UIST 2004, pp. 3-12, 11 pages.
Appert et al., "Context matters: Evaluating Interaction Techniques with the CIS Model," Proc. HCI 2004, Springer Verlag, 279-295, 22 pages.
Bier, et al., Toolglass and Magic Lenses: The See-Through Interface. Proceedings of SIGGRAPH 93, 73-80, 8 pages.
Buxton, et al., "A Study in Two-Handed Input," Proceedings of ACM CHI'86:, 321-326, 10 pages.
Buxton, et al., "Continuous handgesture driven input," Proceedings of Graphics Interface '83, 191-195, 9 pages.
Buxton, W., "An Informal Study of Selection-Positioning Tasks," Proceedings of Graphics Interface '82: 8th Conference of the Canadian Man-Computer Communications Society, 323-328, 11 pages.
Buxton, W., "Chunking and Phrasing and the Design of Human Computer Dialogues," Information Processing '86, Proc. IFIP 10th World Computer Congress, Amsterdam: North Holland, 475-480, 8 pages.
Card, et al., "The Keystroke-Level Model for User Performance Time with Interactive Systems," Communications of the ACM, 1980. 23(7): p. 396-410, 15 pages.
Dillon, et al., "Measuring the True Cost of Command Selection: Techniques and Results," CHI'90, 19-25, 7 pages.
Fitzmaurice, et al., "Tracking Menus," UIST 2003, 71-79, 10 pages.
Grossman, et al., "Hover Widgets: Using the Tracking State to Extend the Capabilities of Pen-Operated Devices," CHI 2006, 10 pages.
Guimbretiere, et al., "FlowMenu: Combining Command, Text, and Data Entry," ACM UIST 2000, 213-216, 4 pages.
Hinckley, et al., "Design and Analysis of Delimiters for Selection-Action Pen Gesture Phrases in Scriboli," CHI 2005, 451-460, 10 pages.
Hinckley, et al., "The Springboard: Multiple Modes in One Spring Loaded Control," CHI 2006, to appear, 10 pages.
Johnson, J., "Modes in non-computer devices," Int. J. Man-Mach. Studies, 1990. 32(4): 423-438, 17 pages.
Kurtenbach, et al., "An emprical evaluation of some articulatory and cognitive aspects of 'marking menus'", J. Human Computer Interaction, 1993. 8(1), 16 pages.
Kurtenbach, et al., "Issues in Combining Marking and Direct Manipulation Techniques," UIST'91, 137-144, 8 pages.
Kurtenbach, et al., "The Hotbox: Efficient Access to a Large Number of Menu-items," CHI'99, 231-237, 7 pages.
Kurtenbach, et al., "The Limits of Expert Performance Using Hierarchic Marking Menus," INTERCHI'93, 482-487, 7 pages.
LaViola, et al., "MathPad2: A System for the Creation and Exploration of Mathematical Sketches," ACM Transactions on Graphics, 2004. 23(3): p. 432-440, 9 pages.
Li, et al., "A. Experimental Analysis of Mode Switching Techniques in Pen-based User Interfaces," CHI 2005, 461-470, 10 pages.
Liao, et al., "PapierCraft: A Command System for Interactive Paper," UIST 2005, 241-244, 10 pages.
Mackay, W. E., "Which Interaction Technique Works When? Floating Palettes, Marking Menus and Toolglasses Support Different Task Strategies," Proc. AVI 2002 International Conference on Advanced Visual Interfaces, ACM, 203-208, 6 pages.

McLoone, et al., "Ergonomic Principles Applied to the Design of the Microsoft Office Computer Keyboard," IEA 2003 International Ergonomics Association, 5 pages.
Mizobuchi, et al., "Tapping vs. Circling Selections on Pen-based Devices: Evidence for Different Performance-Shaping Factors," CHI 2004, 607-614, 8 pages.
Monk, A., "Mode Errors: A User-centered Analysis and some Preventative Measures Using Keying-contingent Sound," International J. Man-Machine Studies, 1986. 24: p. 313-327, 16 pages.
Moran, et al., "Pen-Based Interaction Techniques for Organizing Material on an Electronic Whiteboard," UIST'97, 45-54, 10 pages.
Norman, D. A., "Categorization of Action Slips," Psychology Review, 1981. 88(1): p. 1-15, 15 pages.
Pier, et al., "Issues for Location-Independent Interfaces," 1992: Technical Report ISTL92-4, Xerox Palo Alto Research Center, 8 pages.
Non-Final Office Action mailed Mar. 17, 2008 from U.S. Appl. No. 11/245,850, 32 pages.
Response filed Jun. 10, 2008 to Non-Final Office Action mailed Mar. 17, 2008 Non-Final Office Action mailed Dec. 30, 2009 from U.S. Appl. No. 11/245,850, 14 pages.
Examiner Interview Summary Record mailed Jun. 13, 2008 from U.S. Appl. No. 11/245,850, 4 pages.
Final Office Action mailed Sep. 17, 2008 to the Final Office Action mailed Sep. 17, 2008 from U.S. Appl. No. 11/245,850, 11 pages.
Response after Final filed Nov. 10, 2008 from U.S. Appl. No. 11/245,850, 8 pages.
Advisory Action mailed Nov. 21, 2008 from U.S. Appl. No. 11/245,850, 3 pages.
Response filed Jan. 5, 2009 from U.S. Appl. No. 11/245,850, 8 pages.
Examiner Interview Summary Record mailed Feb. 4, 2009 from U.S. Appl. No. 11/245,850, 4 pages.
Non-Final Office Action mailed Feb. 5, 2009 from U.S. Appl. No. 11/245,850, 12 pages.
Response filed Apr. 9, 2009 to Non-Final Office Action mailed Feb. 5, 2009 from U.S. Appl. No. 11/245,850, 11 pages.
Final Office Action mailed Jun. 25, 2009 from U.S. Appl. No. 11/245,850, 12 pages.
Examiner Interview Summary Record mailed Aug. 26, 2009 from U.S. Appl. No. 11/245,850, 4 pages.
Hinckley et al., Provisional U.S. Appl. No. 60/683,996, filed May 24, 2005, entitled, "Extended Capabilities of Pen-operated Devices", 55 pages.
Response filed Sep. 25, 2009 to the Final Office Action mailed Jun. 25, 2009 from U.S. Appl. No. 11/245,850, 14 pages.
Non-Final Office Action mailed Dec. 30, 2009 from U.S. Appl. No. 11/245,850, 13 pages.
Examiner Interview Summary Record mailed Jan. 7, 2010 from U.S. Appl. No. 11/245,850, 4 pages.
Response filed Mar. 30, 2010 to Non-Final Office Action mailed Dec. 30, 2009 from U.S. Appl. No. 11/245,850, 17 pages.
Examiner Interview Summary Record mailed Apr. 14, 2010 from U.S. Appl. No. 11/245,850, 4 pages.
Final Office Action mailed Jun. 23, 2010 from U.S. Appl. No. 11/245,850, 14 pages.
Examiner Interview Summary Record mailed Oct. 14, 2010 from U.S. Appl. No. 11/245,850, 4 pages.
Response filed Oct. 15, 2010 to the Final Office Action mailed Jun. 23, 2010 from U.S. Appl. No. 11/245,850, 29 pages.
Non-Final Office Action mailed Oct. 3, 2014 from U.S. Appl. No. 11/245,850, 20 pages.
Response filed Jan. 5, 2015 to Non-Final Office Action mailed Oct. 3, 2014 from U.S. Appl. No. 11/245,850, 22 pages.
Applicant Initiated Interview Summary mailed Jan. 30, 2015 from U.S. Appl. No. 11/245,850, 3 pages.
Applicant's Summary of Interview filed Mar. 2, 2015 from U.S. Appl. No. 11/245,850, 1 page.
Final Office Action mailed Jun. 3, 2015 from U.S. Appl. No. 11/245,850, 21 pages.
Poller et al., "The Effect of Modes on Text Editing by Experienced Editor Users," Human Factors, 26(4), pp. 449-462, 14 pages.
Pook et al., "Control Menus: Execution and Control in a Single Interactor," CHI 2000 Extended Abstracts, Apr. 1-6, 2000, The Hague, The Netherlands, pp. 263-264, 2 pages.

(56) References Cited

OTHER PUBLICATIONS

Raskin, J., "The Humane Interface: New Directions for Designing Interactive Systems," 2000 ACM Press, 267 pages.
Saund et al., "Stylus Input and Editing Without Prior Selection of Mode," UIST'03, pp. 213-216, 4 pages.
Sellen et al., "The Prevention of Mode Errors through Sensory Feedback," Human Computer Interaction, 1992, 7(2), pp. 141-164, 21 pages.
Sellen et al., "The Role of Visual and Kinesthetic Feedback in the Prevention of Mode Errors," Proc. IFIP Interact '90 Human-Computer Interaction, pp. 667-673, 7 pages.
Tesler L., "The Smalltalk Environment," Blasts From the Past, 15 Years Ago in BYTE, 6(8), pp. 90-147, Aug. 1996, 17 pages.
Wilson F. R., "The Hand: How Its Use Shapes the Brain, Language, and Human Culture," 1998, New York, Pantheon Books, 422 pages.
Zhao et al., "Simple vs. Compound Mark Hierarchical Marking Menus," UIST 2004, vol. 6, Issue 2, pp. 33-42, 10 pages.
Hinckley et al., "Phrasing Techniques for Multi-Stroke Selection Gestures," Graphics Interface, 2006, pp. 147-154, 8 pages.
"Clicky Mouse" (pitrinec.com), Clicky Mouse Software Product, published Aug. 31, 2000, retrieved on Feb. 24, 2008, 4 pages.
"Smart Technologies", Digital Vision Touch Technology, Feb. 2003, 10 pages.
Balakrishnan et al., "The PadMouse: Facilitating Selection and Spatial Positioning for the Non-dominant Hand", ACM CHI Conference on Human Factors in Computing Systems, 1998, last accessed Jan. 15, 2006, pp. 9-16, 8 pages.
Buxton, "A Three-State Model of Graphical Input, Human-Computer Interaction", Interact '90, 1990, Elsevier Science Publishers B.V., Amsterdam, last accessed Apr. 17, 2006, pp. 449-456, 11 pages.
Buxton, "Lexical and Pragmatic Considerations of Input Structures", Computer Graphics, 1983, vol. 17, No. 1, last accessed Jun. 30, 2005, pp. 31-37, 11 pages.
Friedlander et al., "Bull's Eye! When Fitt's Law Doesn't Fit", ACM CHI Conference on Human Factors in Computing Systems, 1998, last accessed Jan. 16, 2006, pp. 257-264, 8 pages.
Goldberg et al., "Touch Typing with a Stylus", Apr. 1993, last accessed Apr. 18, 2008, 8 pages.
Guiard, Y., "Asymmetric Division of Labor in Human Skilled Bimanual Action: The Kinematic Chain as a Model", The Journal of Motor Behavior, 1987, 27 pages.
Guimbretiere et al., "Fluid Interaction for High Resolution Wall-size Displays", 2002, Stanford University, 10 pages.
Hinckley et al., "Interaction and Modeling Techniques for Desktop Tow-Handed Input", 1998, last accessed Jan. 10, 2006, 10 pages.
Hinckley et al., "Quantitative Analysis of Scrolling Techniques", CHI 2002, 8 pages.
Hinckley et al., "Stitching: pen Gestures that Span Multiple Displays", Advanced Visual Interfaces, May 25-28, 2004, Gallipoli, Italy, pp. 23-31, 9 pages.
Jacko et al., "Hierarchical Menu Design: Breadth, Depth and Task Complexity", 1996, Perceptual and Motor Skills, 82, pp. 1187-1201, 15 pages.
Kiger, "The Depth/Breadth Tradeoff in the Design of the Menu-driven Interfaces", 1984, International Journal of Man-Machine Studies, 20, pp. 201-213, 15 pages.
Kurtenbach et al., "Contextual Animation of Gestural Commands", Computer Graphics Forum, 1994, vol. 13, No. 5, Blackwell Publishers, Cambridge, MA, USA, last accessed Jun. 30, 2005, pp. 305-314, 10 pages.
Kurtenbach et al., "User Learning and Performance with Marking Menus", ACM CHI Conference on Human Factors in Computing Systems, 1994, pp. 258-264, 11 pages.
Kurtenbach, "The Design and Evaluation of Marking Menus", 1993, University of Toronto, last accessed Jan. 17, 2006, 201 pages.
Larson et al., "Web Page Design: Implications of Memory, Structure and Scent for Information Retrieval", SCM CHI Conference on Human Factors in Computing Systems, 1998, last accessed Jan. 16, 2006, pp. 25-32, 8 pages.
MacKenzie, "Fitts' Law as a Research and Design Tool in Human-computer Interaction", 1992, last accessed Jan. 10, 2006, pp. 91-139, 50 pages.
McGuffin et al., "FaST Sliders: Integrating Marking Menus and the Adjustment of Continuous Values", The Graphics Interface Conference, 2002, last accessed Jan. 17, 2006, pp. 35-41, 7 pages.
Moscovich et al., "Navigating Documents with the Virtual Scroll Ring", UIST '04, pp. 57-60, 4 pages.
Mynatt et al., "Flatland: New Dimensions in Office Whiteboards", CHI '99 Proceedings of the SIGCHI Conference on Human Factors in Computing Systems, 1999, Pittsburgh, PA, USA, pp. 346-353, 8 pages.
Newman et al., "DENIM: An Informal Web Site Design Tool Inspired by Observation of Practice", J. Human-Computer Interaction, 18(3), Sep. 2003, pp. 259-324, 66 pages.
Pierce et al., "Toolspaces and Glances: Storing, Accessing and Retrieving Objects in 3D Desktop Applications", Symposium on Interactive 3D Graphics, 1999, pp. 163-168, 6 pages.
Smith et al., "The Radial Scroll Tool: Scrolling Support for Stylus- or Touch-Based Document Navigation", Proceedings of the 17th Annual ACM symposium on User Interface Software and Technology, 2004, pp. 53-56, 4 pages.
Wing, A., "Timing and Co-ordination of Repetitive Bimanual Movements", Quarterly J. Exp. Psych, 34(3), 1982, 10 pages.
Wobbrock et al., "EdgeWrite: A Stylus-Based Text Entry Method Designed for High Accuracy and Stability of Motion", ACM UIST Symposium on User Interface Software and Technology, 2003, 310 pages.
Zeleznik et al., "Sketch: An Interface for Sketching 3D Scenes", ACM SIGRAPH 2006 Courses, Jul. 30-Aug. 3, 2006, Boston, Massachusetts, 6 pages.
Zeleznik, R., "Fluid Inking: Modeless Integration of gestures with Inking", Brown University, Jul. 2005, Technical Report CS-05-10, 12 pages.
Response Filed Sep. 3, 2015 to the Non-Final Office Action Mailed Jun. 3, 2015 from U.S. Appl. No. 11/245,850, 28 Pages.
Non-Final Office Action Mailed Oct. 5, 2015 From U.S. Appl. No. 11/245,850, 22 Pages.

* cited by examiner

TOUCH SCREEN CONTROL

BACKGROUND

Computing devices continue to evolve into different configurations, such as notebook computers, personal digital assistants (PDAs), cell phones/smart phones, etc. Traditionally, computing devices employed separate input devices, such as mice and/or keyboards and output devices, such as a display screen. Various configurations have been developed and refined to allow the user to easily control the computing device in these traditional scenarios. For instance, some of these configurations employ a toolbar of commands at a set location on the display and the user can control the computing device by selecting commands with an input device such as a mouse.

Relatively recently touch screens have become more readily available. Touch screens blur the traditional lines by offering the capability to function as both an input device and an output device. Adapting the traditional configurations to touch screen scenarios tends not to produce high user satisfaction and/or underutilizes the capabilities offered by the touch screen.

SUMMARY

This document relates to touch screen controls. For instance, the touch screen controls can allow a user to control a computing device by engaging a touch screen associated with the computing device. One implementation can receive at least one tactile contact from a region of a touch screen. This implementation can present a first command functionality on the touch screen proximate the region for a predefined time. It can await user engagement of the first command functionality. Lacking user engagement within the predefined time, the implementation can remove the first command functionality and offer a second command functionality.

Another implementation can receive a first tactile contact from a user on a touch screen. The implementation can present a toolbar of commands while the receiving continues. The implementation can receive a second tactile contact from the user over an individual command of the toolbar. The implementation can provide a corresponding command functionality. This implementation can also allow the user to control the corresponding command functionality by sliding the first tactile contact and the second tactile contact on the touch screen.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

More and more, computing systems are sold with touch screens. Touch screens accept user input based on physical or tactile contact. A user can achieve this tactile contact by engaging contact detectors included in the touch screen with his/her finger(s), a stylus(es), or other mechanism. The present concepts allow a user to call up a command architecture by engaging the touch screen. Further, the command architecture can be presented proximate to the user engagement, rather than at a fixed location, including—but not restricted to—being superimposed in a semi-transparent form directly over the area of engagement. On both mobile form-factors and large-screen formats (tabletops, whiteboards, etc.) it can be desirable to activate commands in-place or proximate to the locus of interaction. On small mobile devices this proximity can have the virtue of avoiding permanently visible icons, palettes, or other widgets. On large format displays this proximity can have the virtue of avoiding round trips to a distant user interface control, and, by appearing at a location dictated by the position of the user's hand, thereby ensuring that controls are within reach of the user (in contrast to appearing in a menu bar at the top of a large wall-mounted display where they may well be out of reach of many users).

The present concepts can also attempt to distinguish user intent when the user engages the touch screen. Toward that end, a first command function can be offered to the user responsive to the user engagement. For example, the user touches the touch screen and a toolbar is presented proximate the touch. A determination can be made whether the intended command function was offered to the user. For instance, the determination can be based upon user response to the offered command function. Continuing with the above example, if the user does not select a command from the presented toolbar, then it is likely that the intent of the user remains unsatisfied. An alternative command function can be offered to the user if it is determined that an incorrect command function was offered. For example, the toolbar may be removed and content near the user touch may be highlighted.

Example Scenarios

FIGS. 1-23 illustrate exemplary manifestations of the touch screen control concepts described in this document.

FIGS. 1-5 collectively illustrate a first touch screen control implementation. FIGS. 1-5 include a computing device or "device" 102(1) that has a touch screen 104(1). User interaction with the touch screen is represented by a user's hand 106(1).

Figure 1:
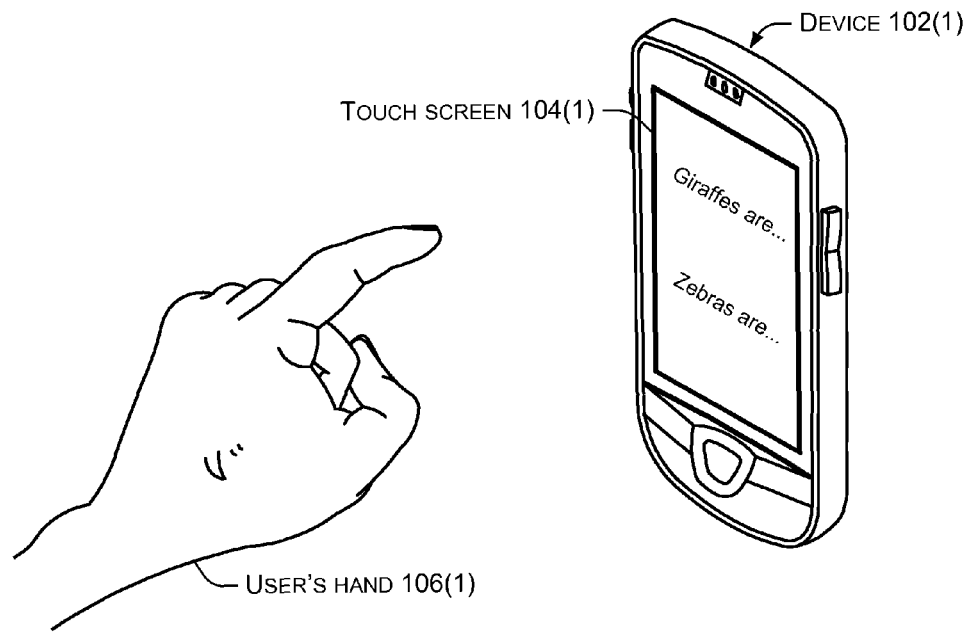
FIGS. 1-23 are examples of touch screen control usage scenarios in accordance with some implementations of the present concepts.

Initially, in FIG. 1 the user's hand 106(1) is proximate but not contacting touch screen 104(1). Content in the form of "Giraffes are . . . " and "Zebras are . . . " is displayed on the touch screen.

Figure 2:
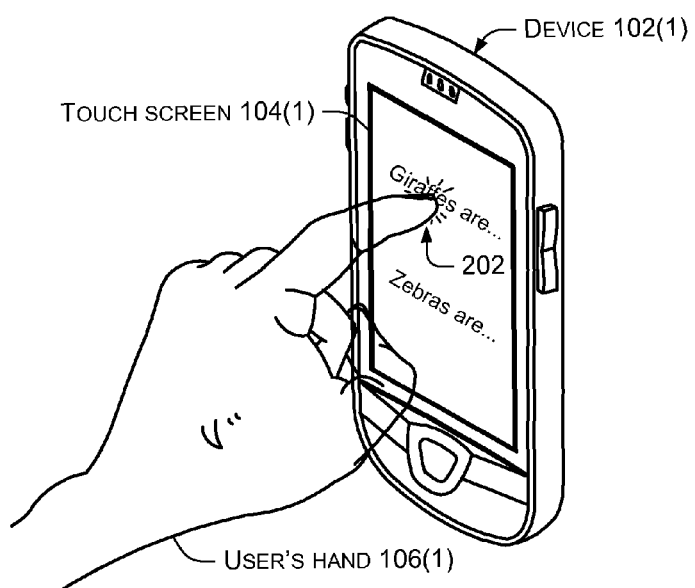

In FIG. 2, the user's hand 106(1) engages the touch screen 104(1). In this case, the user's fingertip engages the touch screen proximate to the "Giraffes are . . . " content as indicated at 202.

Figure 3:
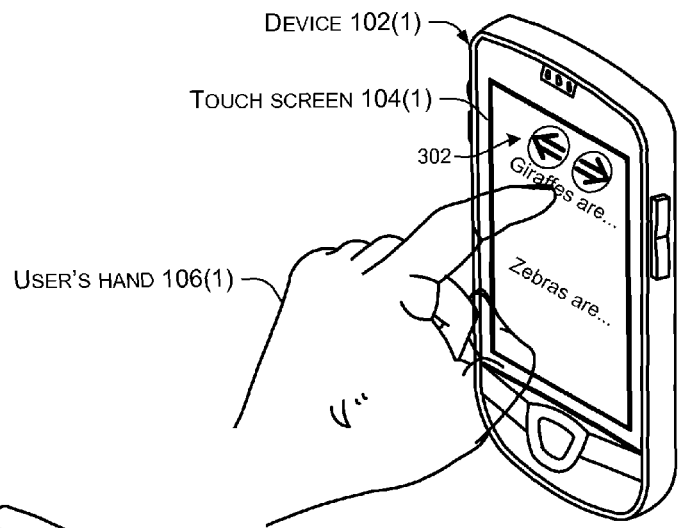

In FIG. 3, the device 102(1) can attempt to determine the user's intent associated with the fingertip engagement of FIG. 2. In this example, the device 102(1) offers a first set of commands 302 to the user. In this case, for purposes of explanation, the first set of commands 302 includes a 'back arrow' and a 'forward arrow' or 'next arrow'. In this implementation, the first set of commands are offered proximate to the fingertip engagement. In this case, "proximate to" means that the location of the first set of commands is based at least in part upon the location of the finger engagement rather than being at a predetermined fixed location, such as the top or bottom of the touch screen. In some of these cases, "proximate to" can mean at or adjacent to the location of the finger engagement. In other cases, the location of the first set of commands may be farther from the location of finger engagement, but still based at least in part upon the finger engagement location.

Figure 4:
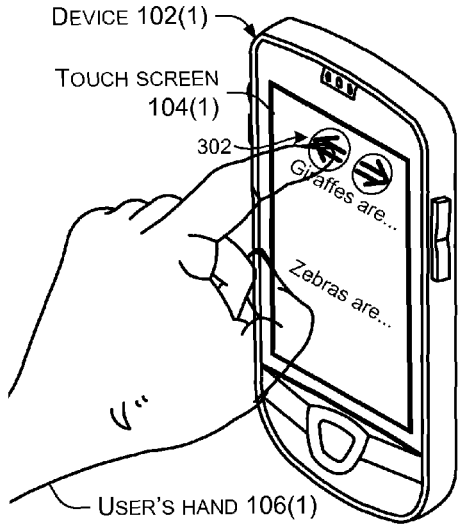
Figure 5:
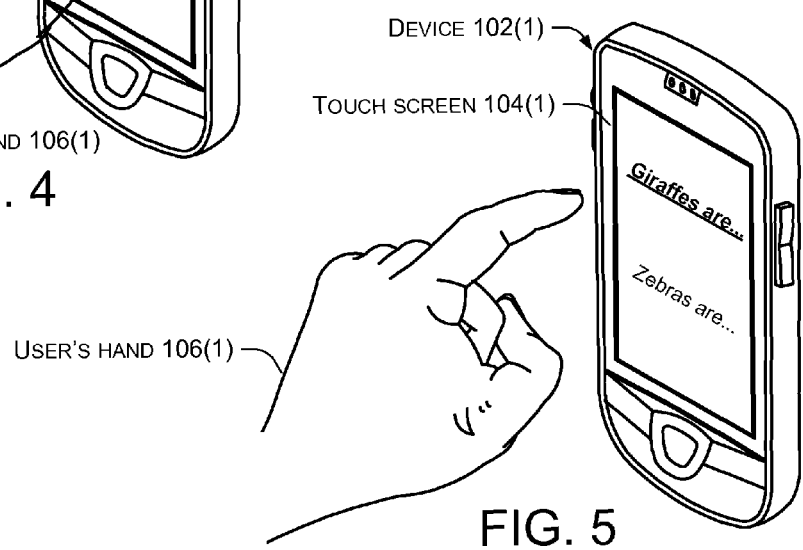

FIGS. 4 and 5 offer two alternative scenarios that can occur responsive to the scenario of FIG. 3. In FIG. 4, the user, via user's hand 106(1), engages a command of the first set of commands 302. In this example, the user engages the 'back arrow'. Thus, in this scenario the device accurately predicted the user's intent and offered appropriate control options to the user.

FIG. 5 illustrates an alternative scenario where the user does not engage any of the offered set of commands 302 within a predefined time period. In this case, the device 102(1) can interpret the user's lack of engagement of the offered commands as an indication that the user's intent has not been satisfied. In such a scenario, the device can remove the first set of commands and offer another command functionality. In some implementations, the first set of commands can be removed by gradually fading them out over a period of time, such as one second. In the example of FIG. 5, the device highlights displayed content that is proximate to the contact (e.g., "Giraffes are . . . ") (now bold, underlined text) for the user and can automatically conduct a web-search on the highlighted text for the user. (The results of the web-search are not illustrated here). The above discussion illustrates how the device can attempt to offer desired commands to the user and can update the offered commands based upon the user's response.

Figure 6:
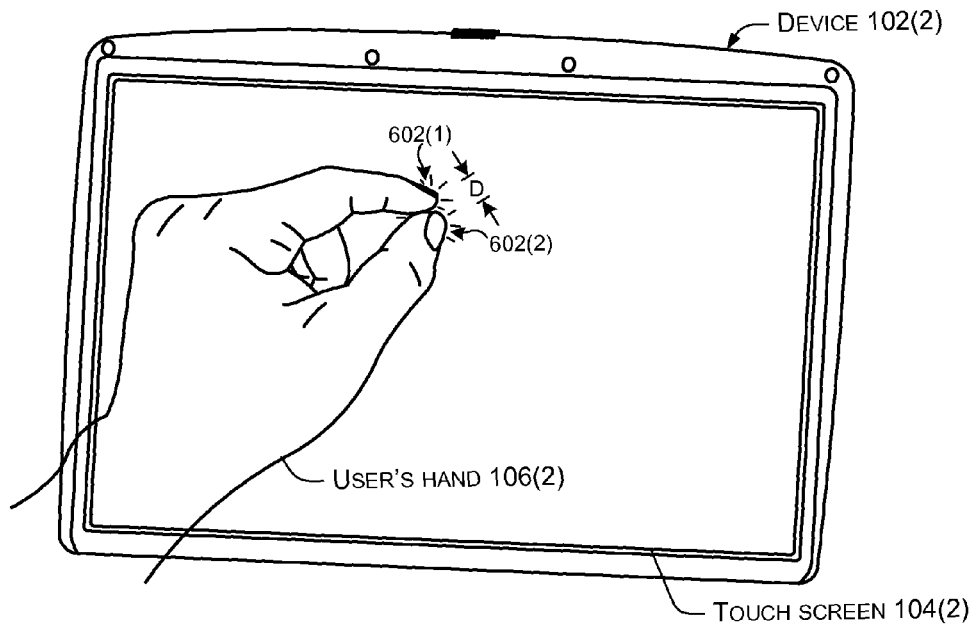
Figure 7:
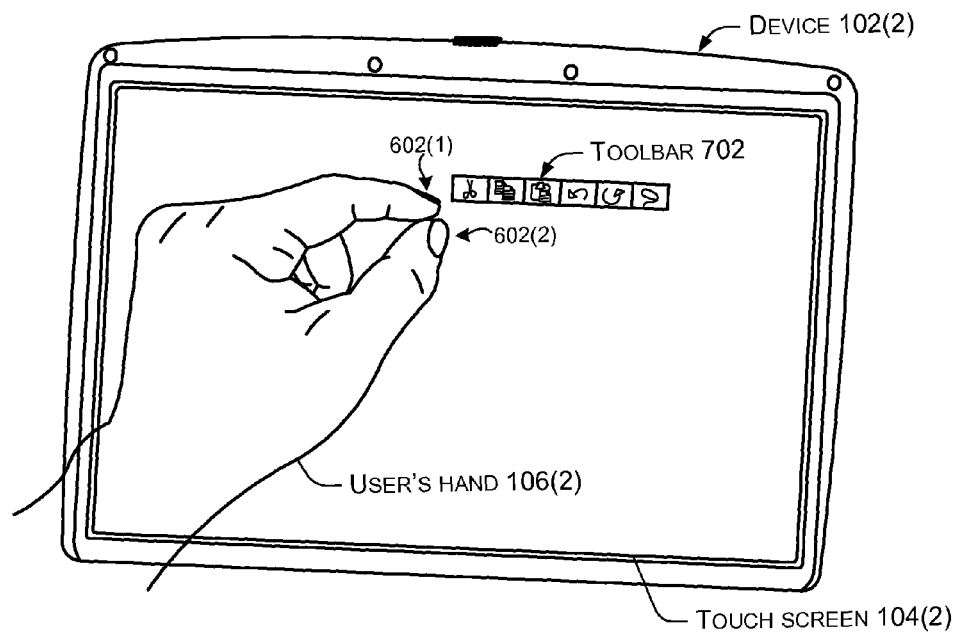
Figure 8:
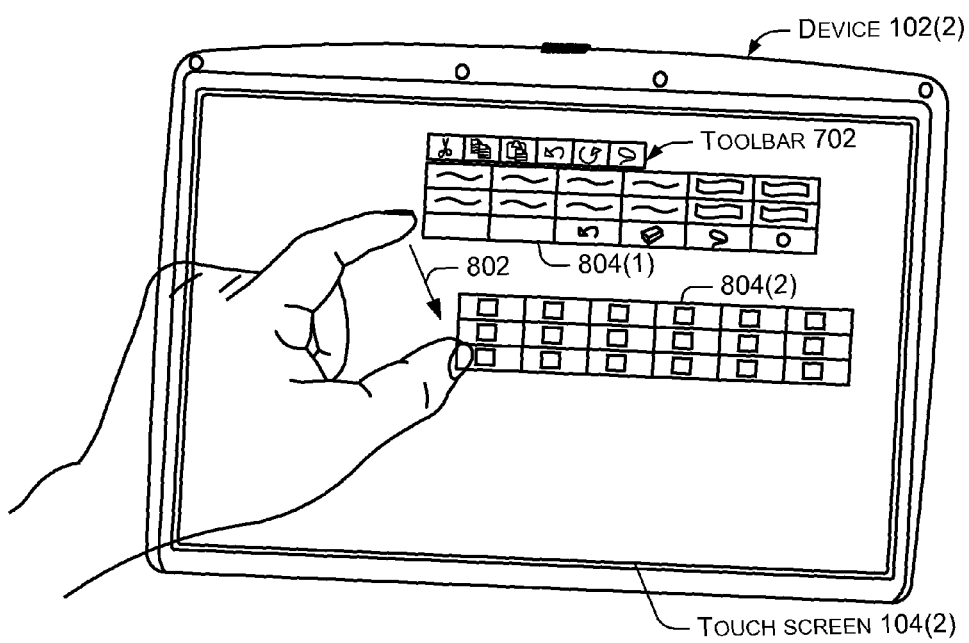

FIGS. 6-8 collectively illustrate a second touch screen control implementation.

Initially, in FIG. 6 a user's hand 106(2) engages touch screen 104(2) with two contact points 602(1) and 602(2) at substantially the same time (such as +/−0.5 seconds). Device 102(2) can calculate an initial distance D between the two contact points 602(1) and 602(2). The device can attempt to determine user intent from the two contact points. For instance, if the two contact points are touching one another, or distance D is less than a predefined distance or defined value, the device can interpret the user intent as being different than an instance where the contact points are at a distance that is greater than distance D. For example, the predefined distance can be 0.5 inches. In such a case, two substantially simultaneous contacts within 0.5 inches can be treated differently than those equaling or exceeding 0.5 inches.

FIG. 7 illustrates a subsequent view where the device displays a first command set in the form of toolbar 702 responsive to the two user contact points discussed above relative to FIG. 6. In this instance, assume that the distance D is less than the predetermined value.

FIG. 8 shows a subsequent view where the user maintains contact with the touch screen 104(2) and spreads the contact points away from one another. In this example the user's thumb slides downward as indicated by arrow 802. Alternatively, the predefined distance could be altered by moving the index finger and/or both the index finger and the thumb could also be moved, to essentially the same effect. In response to such slide action, the toolbar 702 can be extended, offering additional commands 804(1), and/or, offering additional toolbars 804(2) as indicated in this example.

Thus, a mechanism is provided that not only enables the presentation of additional commands, but in which those commands can be organized by functional groups as indicated at 804(1) and 804(2). While an initial toolbar and two additional toolbar functionalities are illustrated, any number of toolbars or toolbar functionalities can be generated for the user responsive to the slide action. Further, in this example the toolbar 702 is expanded via two organized functional groups 804(1) and 804(2). In other implementations, expanding toolbar 702 may simply increase the number of displayed icons that are listed on the toolbar without the toolbar being broken into discrete sub-units. In a further configuration the expanding toolbar could maintain highly used commands in the initial portion of the toolbar and add additional commands as the toolbar is expanded.

In this case the toolbar 702 is expanded in what can be termed an 'accordion fashion' that follows the movement and position of the user contacts (e.g., the toolbar is adjusted in a manner that corresponds to the user action). Other implementations can expand the toolbar in other ways, such as in a radial fashion, or only horizontally (e.g., left-to-right) rather than following both horizontal and vertical sliding. Recall that in this case, the device 102(2) determined based at least in part on distance D that the user intent related to calling up a toolbar. In an instance where the distance D exceeded the predetermined value, then the device may have offered other command options to the user. For example, the device may have determined that the user wanted to select and zoom content between the two contact points (e.g., "zoom function").

Alternatively or additionally to deriving user intent from initial distance D, user intent can be inferred from the slide action. For instance, if the user maintains the contact 602(1) stationary while sliding contact 602(2) (e.g., the thumb) away, the technique can interpret that the user intent is to expand the toolbar. In contrast, if the user slides both contacts 602(1) and 602(2) away from one another, the technique can interpret that the user intent is to zoom on content between the contacts.

In summary, the present implementations can offer enhanced command functionality to a user of the device 102 and attempt to offer individual command functionalities to match user intent. Further, some of these implementations can utilize subsequent user actions to further refine the presented command functionality. Also, while a two finger pinch example is illustrated, other implementations can utilize other pinch gestures, such as a three finger pinch gesture.

FIGS. 9-16 collectively illustrate a third touch screen control implementation that is similar to the second touch screen implementation described above.

Figure 9:
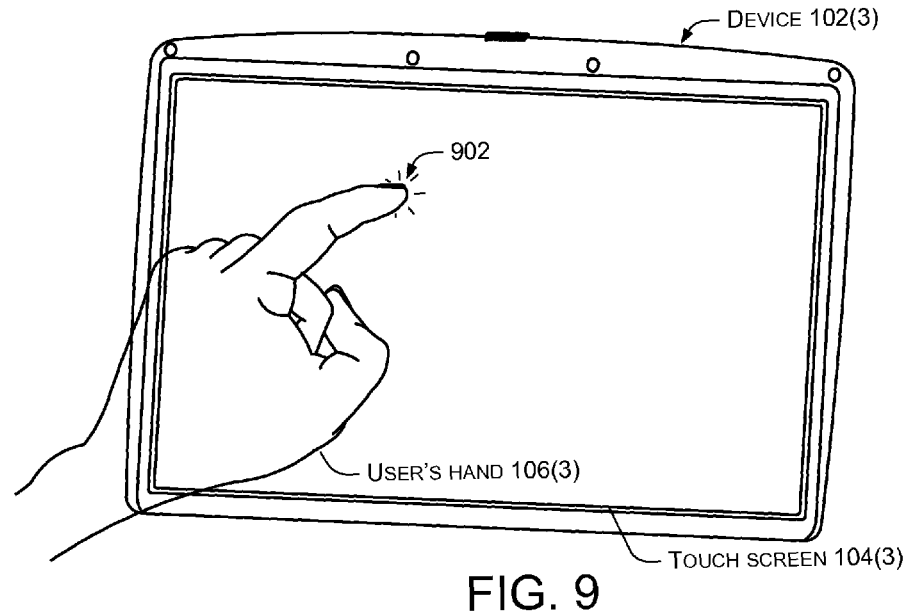

Initially, in FIG. 9 a user's hand 106(3) engages touch screen 104(3) of device 102(3) with a single contact point 902. In this case, the single contact point is made by the tip of the user's index finger. Some implementations can measure the size of the single contact point and utilize the size as a parameter for determining user intent. For instance, a large contact point, such as where the user's palm inadvertently contacts the touch screen can be interpreted differently than a fingertip size contact point. Alternatively or additionally, the orientation and/or shape of the contact point can be used as parameters to determine user intent.

Figure 10:
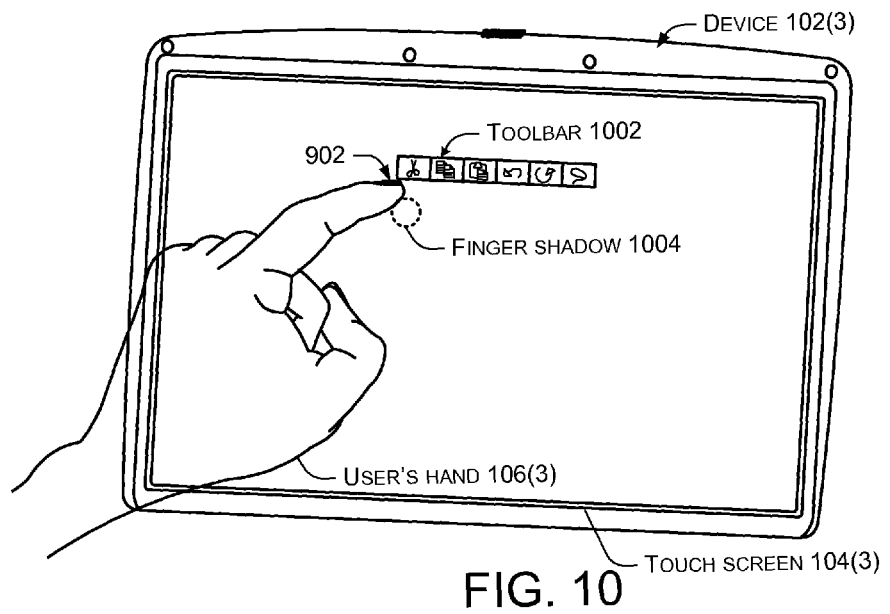

FIG. 10 shows a subsequent view of device 102(3) where a toolbar 1002 is presented proximate to the location of the single contact point 902. A finger shadow 1004 is also presented for the user proximate to the single contact point. The finger shadow can be presented based upon a determination of the user's intent with the single contact point. The purpose of the finger shadow is explained below relative to FIGS. 11-12. Briefly, a finger shadow can offer the user the option of expanding a presented toolbar without the user having to generate two simultaneous contacts.

Note also that some implementations can utilize a context of the contact point 902 as a factor or parameter for determining user intent. For instance, if the contact point is over text or an icon, a first user intent may be determined. In contrast, if the contact point is in a 'blank' area of the touch screen then a different user intent may be determined. Other user actions can also be utilized to determine user intent. For instance, if toolbar 1002 is presented and the user then taps another area of the touchscreen not associated with the toolbar then the user may not want the toolbar and the toolbar can be removed. Some implementations may further attempt to interpret this subsequent user input. For instance, a quick (e.g., less than one second) tap (e.g., in a single location) may be interpreted in a different manner than a contact across the screen (drag or stroke). For example, a quick tap may indicate that the user wants the toolbar to be removed, whereas a drag or stroke may indicate intent to utilize a command from the toolbar.

Figure 11:
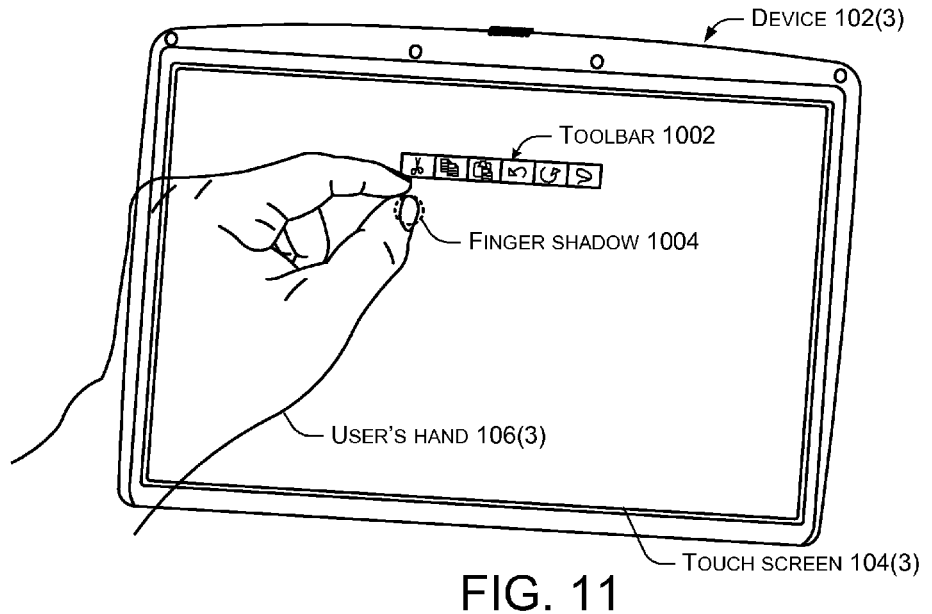

FIG. 11 shows a subsequent view of device 102(3) where the user has contacted the touch screen 104(3) with his/her thumb over the finger shadow 1004. Note that some implementations may position a first finger shadow under the first contact point 902 and may position finger shadow 1004 to indicate or suggest where the user may make another contact. In such a case, the first finger shadow can be associated with toolbar 1002 and finger shadow 1004 can be utilized to instantiate additional commands.

Figure 12:
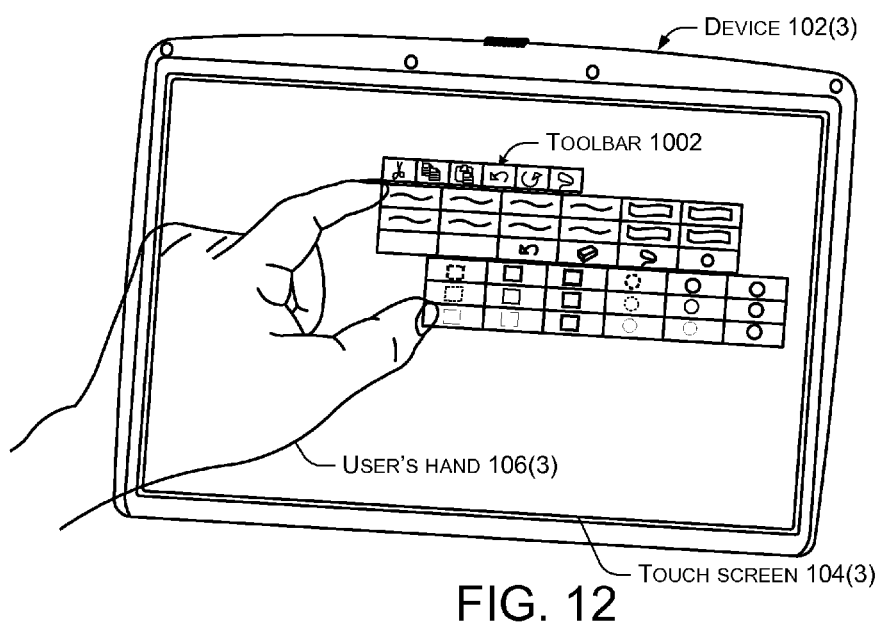

FIG. 12 shows a further view where the user is sliding his/her thumb and index finger apart to expand the toolbar in an accordion fashion similar to that described above relative to FIGS. 6-8. However, in this case, the user does not have to make the simultaneous two fingered contact gesture described above. In this implementation, the option of toolbar expansion is provided to the user should the user so decide to utilize this command. If the command the user desires is in the initial toolbar 1002 presented in FIG. 10, then the user can ignore the finger shadow 1004. In such a case, the finger shadow obscures little or no screen space. Further, some implementations can automatically fade out the finger shadow if the user does not contact it within a predefined duration of time.

The finger shadow 1004 can be utilized in alternative or additional ways. For instance, in one configuration, a user contact with the finger shadow can function to activate a specific command, such as a lasso selection tool, or a last (e.g., most recently) used command. Thus, responsive to the initial contact the finger shadow is generated. If the user contacts the finger shadow and slides his/her fingers apart then the user can expand the toolbar in the accordion fashion described above. The finger shadow can enable this feature without simultaneous contacts. In some implementations the finger shadow can also enable an alternative functionality. For instance where the user engages, but does not slide the finger shadow then another command can be activated. In one implementation, the activated command is the lasso tool. By activating the lasso tool via the finger shadow, the user can immediately start to select content by engaging (e.g., touching and holding) the touch screen with his/her other hand or with a pointing tool in the other hand. In some implementations this touch-and-hold can immediately activate the secondary mode (e.g. lasso). In this case, there no time-out, as there is for traditional touch-and-hold context menus, for example. The finger shadow may also function as a clip board where content can be stored by dragging the content to the finger shadow.

In some implementations the initial contact can be utilized for the main modal controls of an application (such as lasso mode, pen stroke mode, highlighter stroke mode, paintbrush mode, eraser mode, etc.) then the finger shadow would offer whatever mode was most recently used. This configuration can provide a shortcut where the user can quickly move between drawing normal ink strokes, or, via the finger shadow, make strokes in whatever mode was most frequently used. Allowing rapid interleaving of normal pen strokes and any of these commonly used modes can allow the system to efficiently support a variety of common task workflows.

In these embodiments, the most recently used mode can be shown as attached to (or overlaid with) the finger shadow itself, and the toolbar itself can be expanded from the finger shadow. The icons on the toolbar do not change order depending on which mode is currently on the finger shadow itself. This can make the interaction with the toolbar more predictable and habitual for the user.

Figure 13:
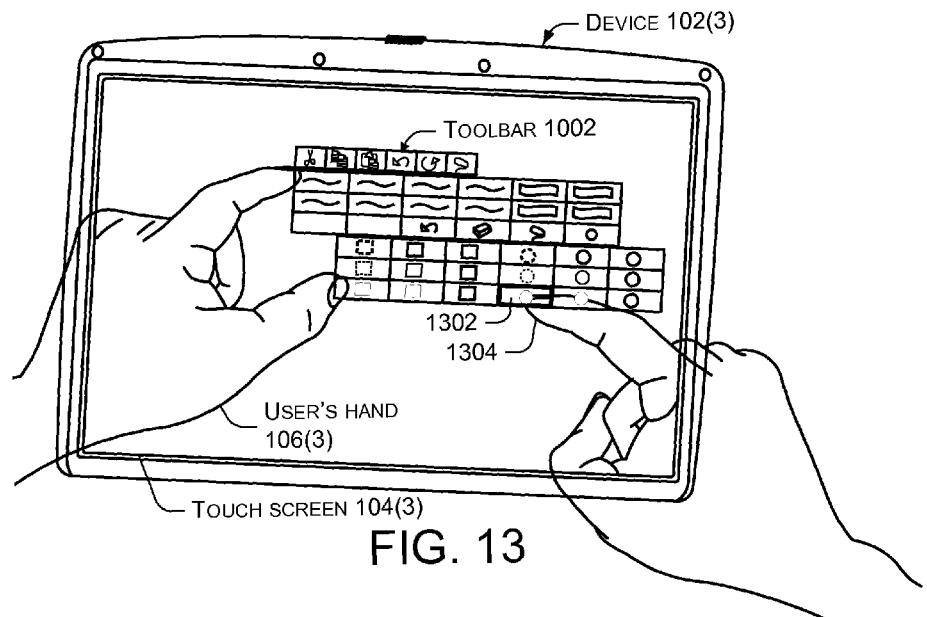
Figure 14:
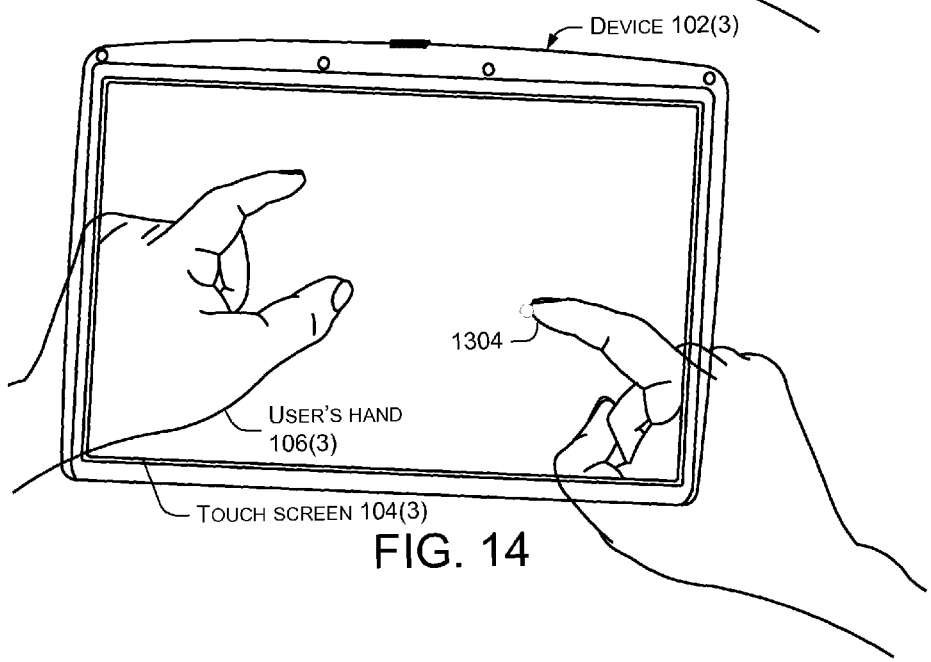
Figure 15:
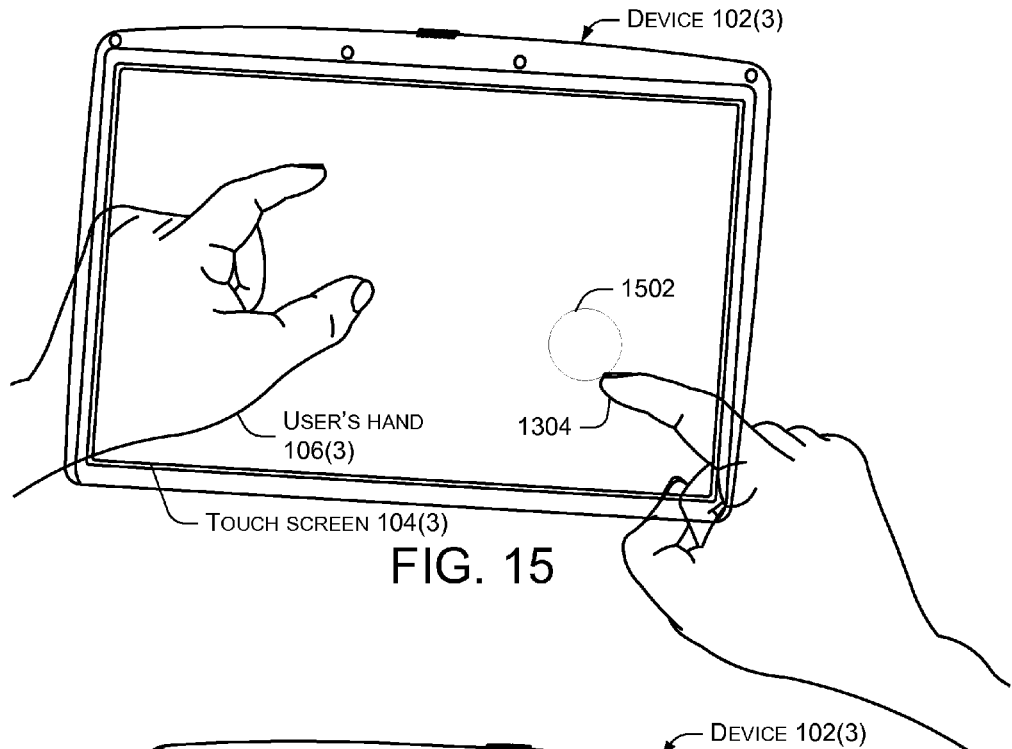
Figure 16:
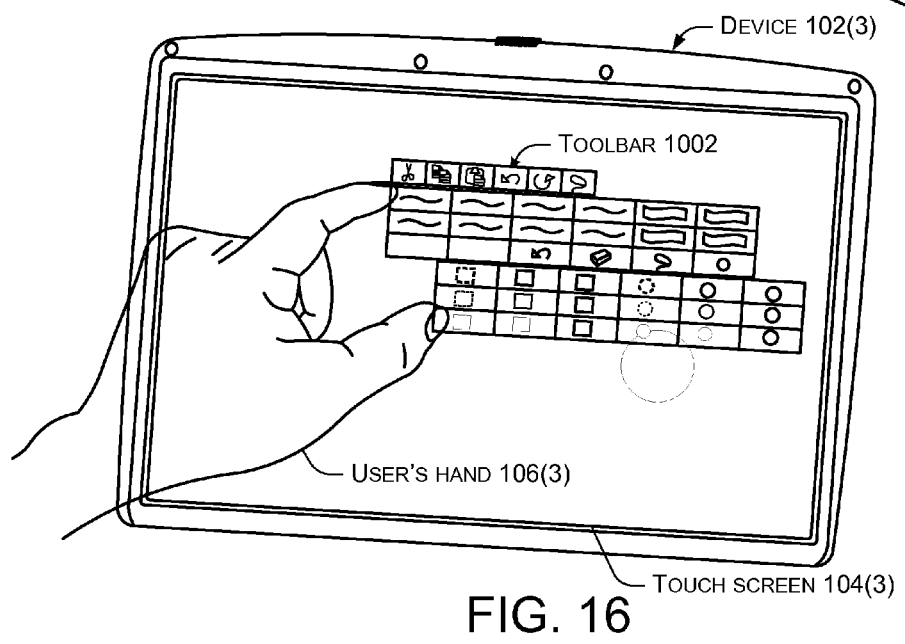

FIG. 13 shows the user engaging an offered command 1302 with a finger tip of his/her right hand as indicated at 1304. In this case, command 1302 is a drawing tool to create an circle shape having a dotted line. In some implementations, the toolbar can remain in its present form while the user utilizes command 1302. In other implementations, the toolbar can be see-though or transparent during the drawing operation. Stated another way, in some implementations, the toolbar is visible at the onset of the task, disappears/fades out when the user selects the option, and optionally may fade back in when the user finishes dragging out the indicated shape. FIGS. 14-16 illustrate another configuration where the toolbar disappears during the drawing operation and reappears at the conclusion of the drawing operation.

FIG. 14 shows a view immediately subsequent to the user selecting command 1302. The toolbar has been removed responsive to the user selecting the circle tool to provide an uncluttered work area on the touch screen 104(3).

FIG. 15 shows the user sliding his/her right finger 1304 to create the desired circle 1502 on the touch screen 104(3). A similar functionality could be achieved by sliding one or more fingers of the left hand and/or fingers of both the right and left hand. For instance, the left hand can be used to control the center of the circle and the right hand can be used to control the diameter of the circle. (Of course, moving the center can also affect the diameter and/or location of the circle).

FIG. 16 shows a subsequent view after the user has completed the circle 1502 and disengaged his/her right finger 1304 from the touch screen 104(3). In this case, toolbar 1002 is again visualized on the touch screen responsive to the disengaging so that the user can select another command.

Some implementations can allow the user to redefine what the "default" or top-most toolbar commands are for the pinch-to-expand-commands gesture. For example, the user can pinch-to-expand all the commands, which are divided into several functional sets. If the user keeps the thumb in contact with the screen, lifts the index finger only, and then brings the index finger down on a different tool palette, then that palette can become the top-most one that is presented first in conjunction with the finger shadow and/or the quick-access toolbar. In this way, the user may optimize which tool palettes are closest at hand to make particular tasks.

FIGS. 17-23 collectively illustrate a fourth touch screen control implementation.

Figure 17:
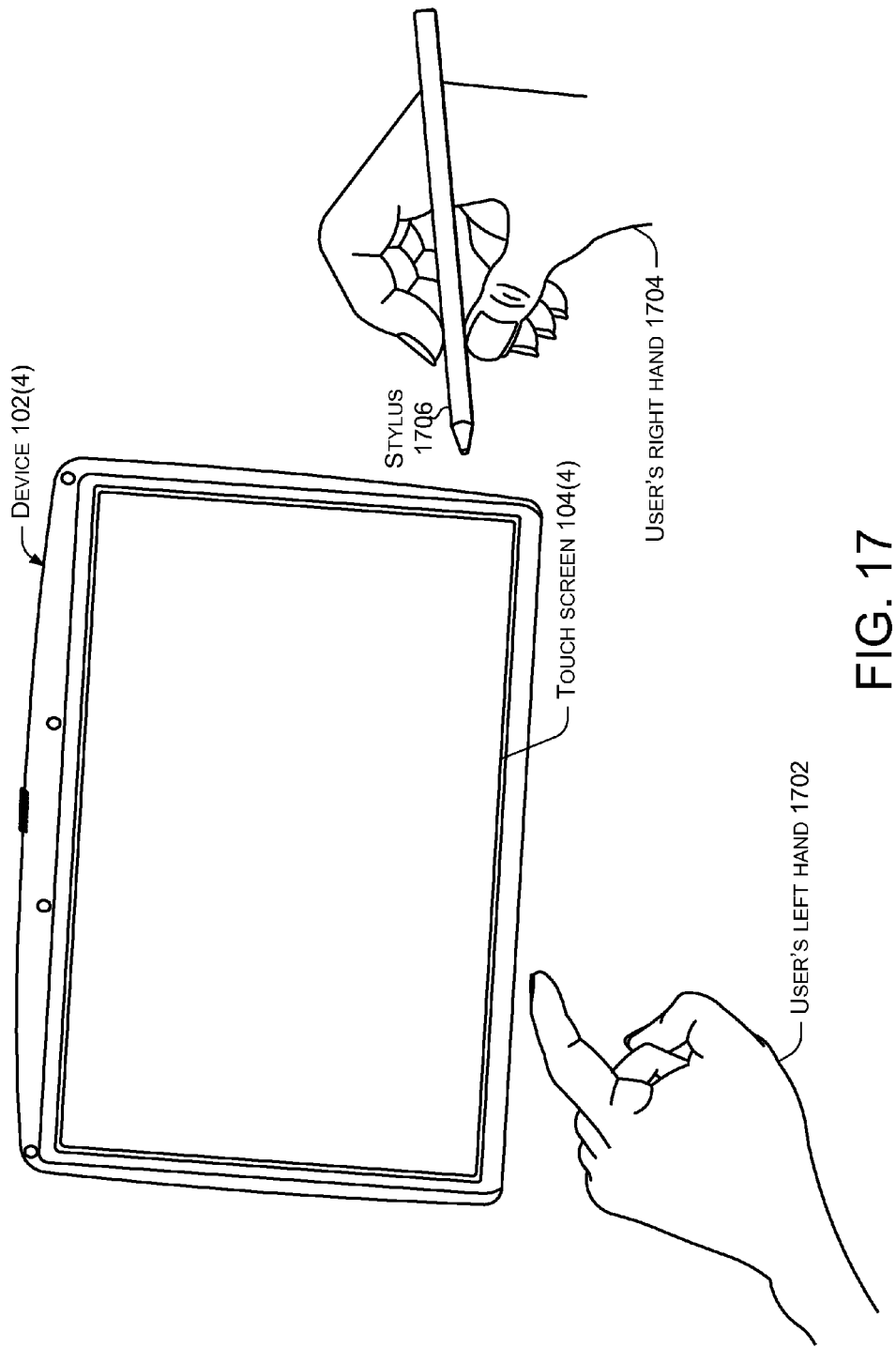

FIG. 17 shows a device 102(4) that has a touch screen 104(4). Further, FIG. 17 shows a user's left and right hands 1702 and 1704. Further, the user is grasping a pointing device, such as a stylus 1706 in his/her right hand.

Figure 18:
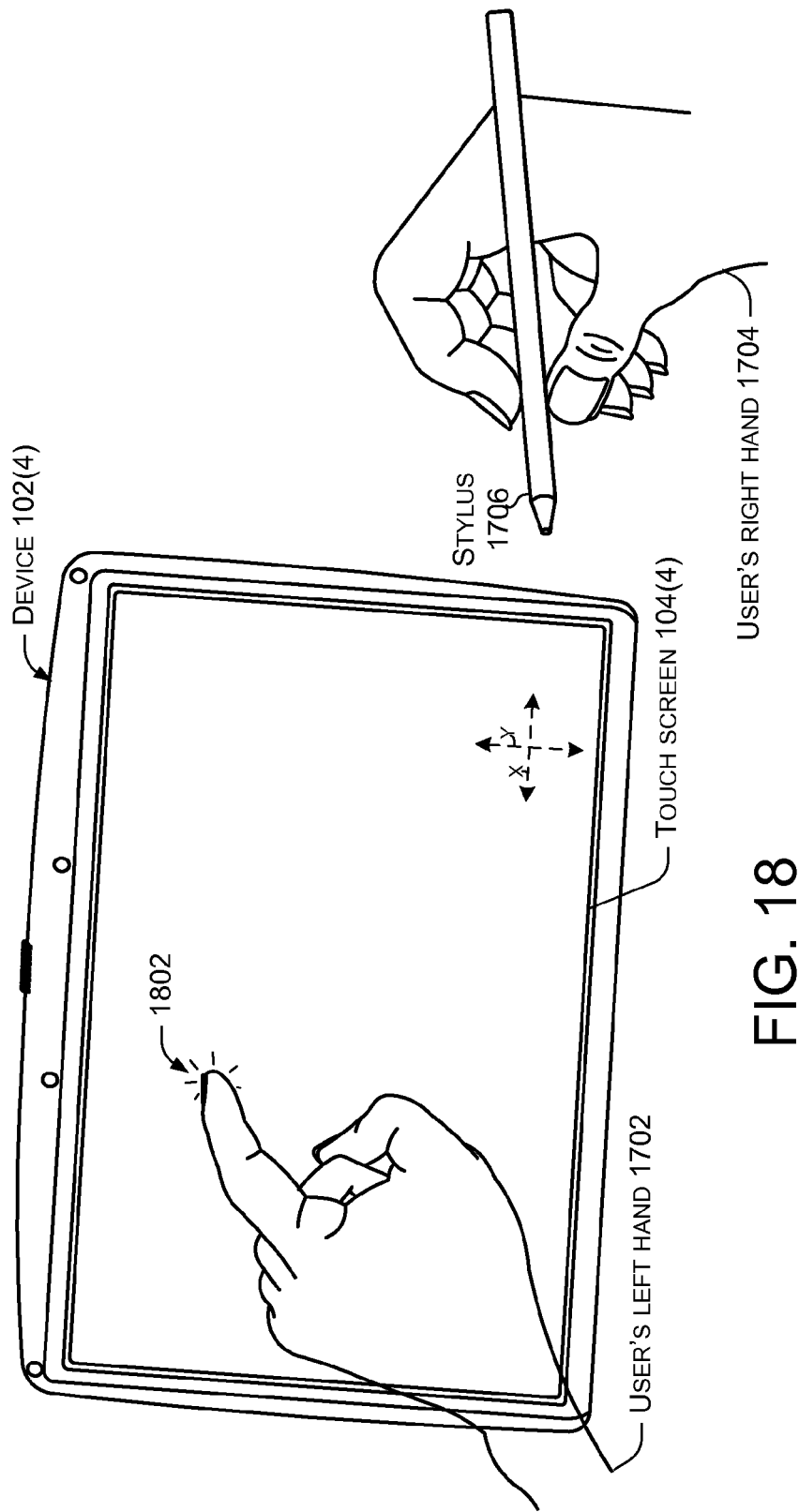

FIG. 18 shows the user making a single contact on the touch screen 104(4) with his/her left index finger as indicated at 1802.

Figure 19:
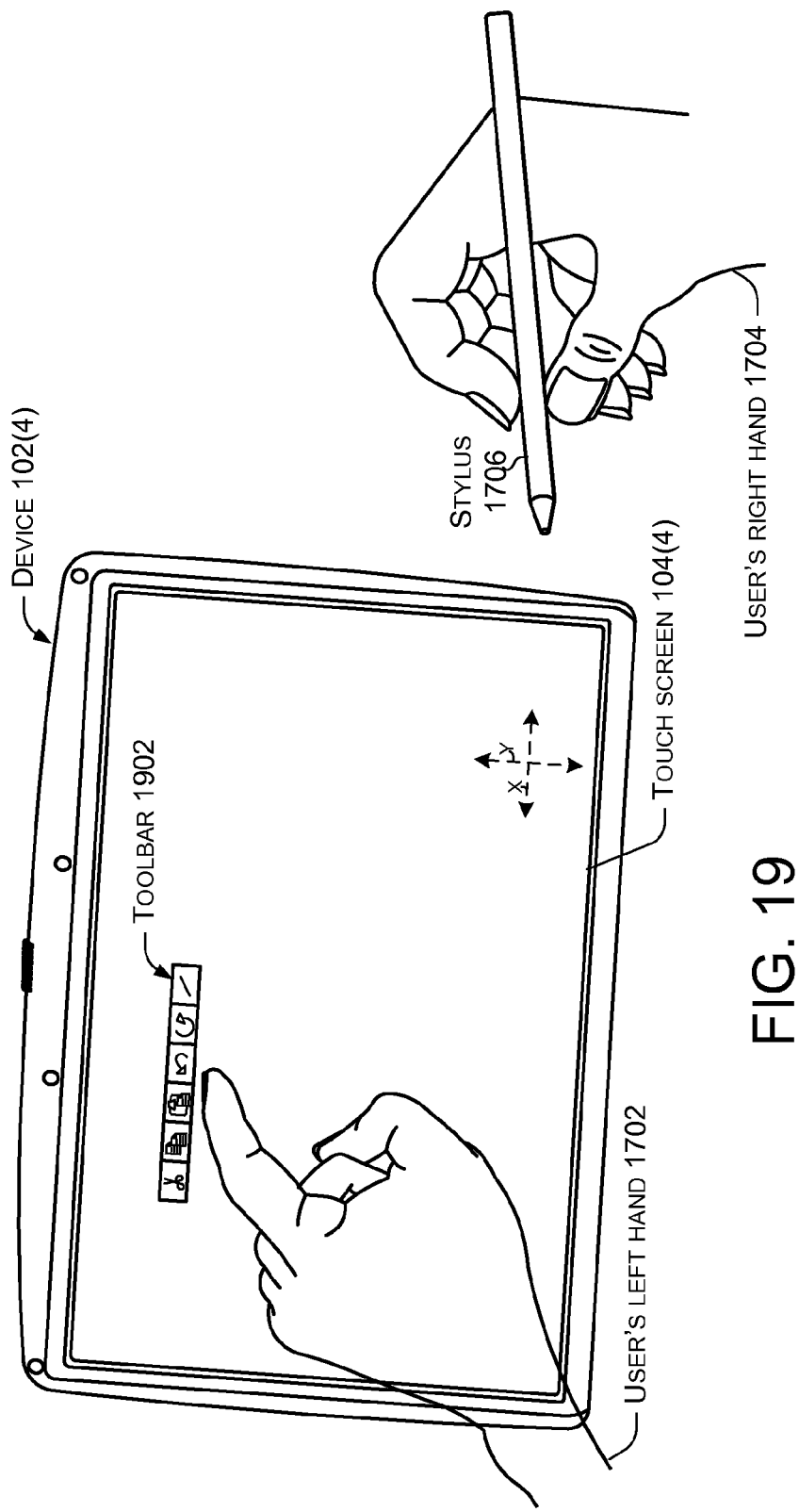

FIG. 19 shows a toolbar 1902 generated responsive to the user contact described above relative to FIG. 18. Note that in this implementation the toolbar is generated proximate to the location of the user contact.

Figure 20:
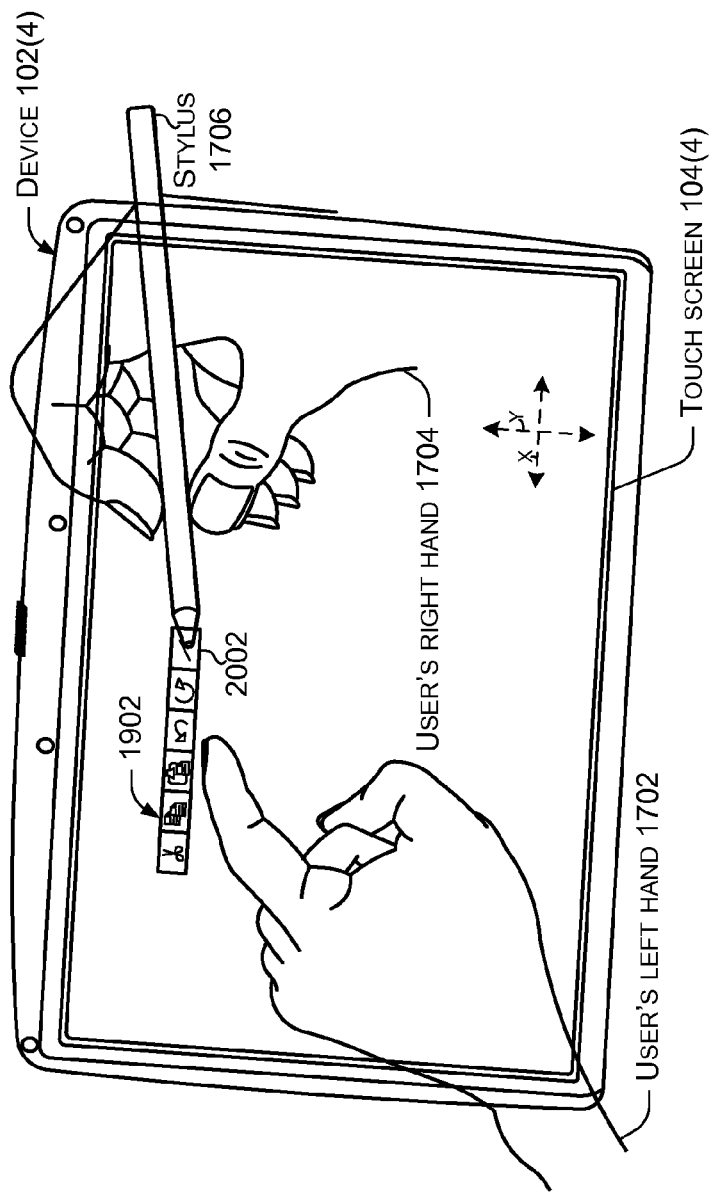

FIG. 20 shows the user selecting an individual command from the toolbar 1902 utilizing the stylus 1706. In this case, the individual command is a straight line drawing tool 2002. Of course, a multitude of other command functionalities can be offered. In this implementation, selection of the straight line drawing tool activates the tool so that drawing can occur without requiring further user actions to begin drawing. This aspect is illustrated in FIG. 21.

Figure 21:
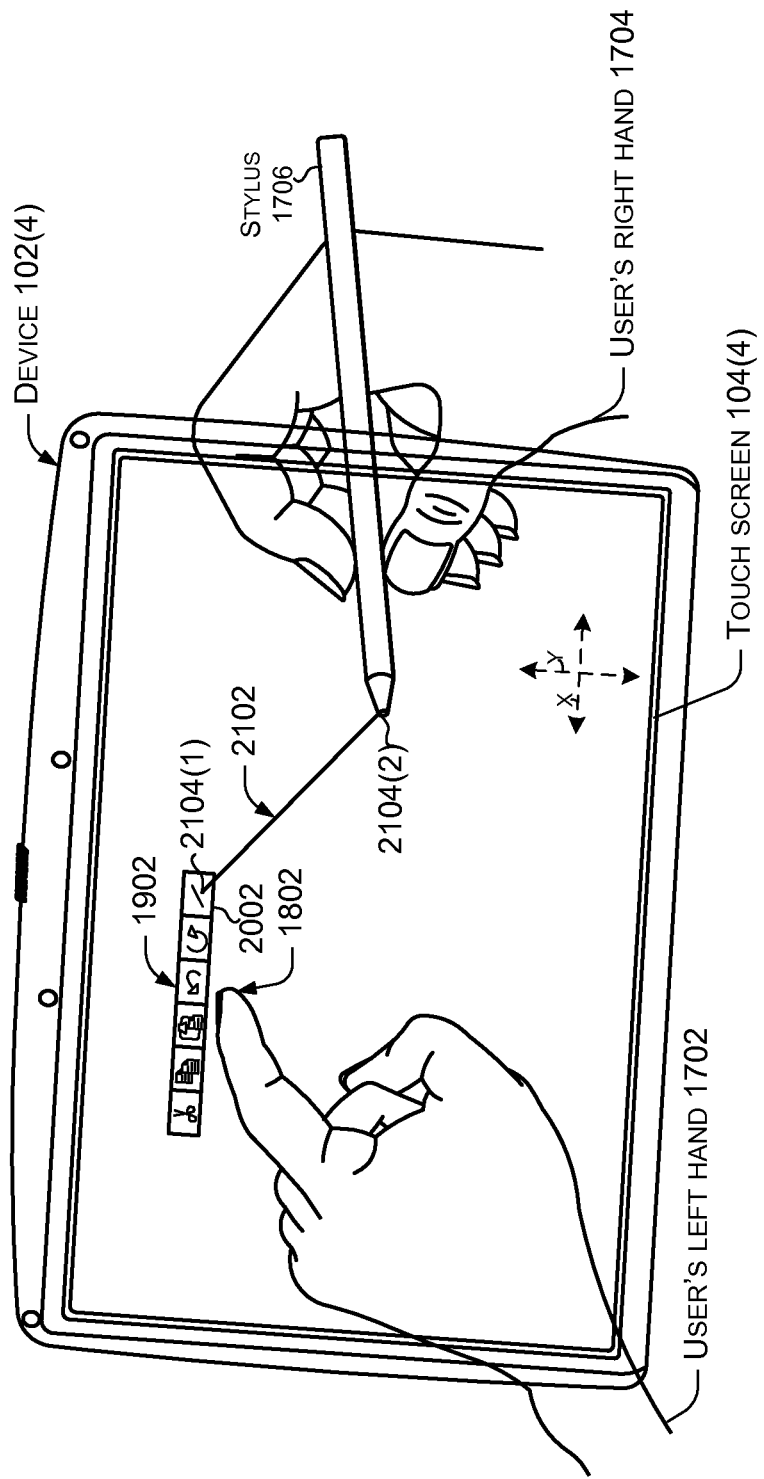

FIG. 21 shows the user having moved the stylus 1706 from its initial position on the straight line drawing tool 2002 to a second position that is downward and to the right on the drawing page. Viewed from one perspective, the user has created a line 2102 that extends between two endpoints 2104(1) and 2104(2). The second endpoint 2104(2) can be thought of as being defined by and co-occurring with the location of the stylus 1706. Thus, the line 2102 can be partially defined by the location of the second endpoint 2104(2), which itself is defined by the location of the stylus. This implementation also allows the user to define the first endpoint 2104(1) of line 2102 utilizing the contact 1802 which in this case is made by the user's left index finger. Recall that the toolbar 1902 that allowed the user to create line 2102 was also generated by contact 1802. While not illustrated, some implementations may employ a visual cue to aid the user in understanding the relationship between contact 1802 and the first endpoint 2104(1). For instance, a colored dot can be presented on the touch screen proximate to the user's left index finger and another dot of the same color can be presented proximate to the first end point 2104(1). If the user moves his/her fingertip (described below relative to FIG. 22) the relative orientation and distance of the two colored dots can be maintained. In some implementations, the two colored dots (or other graphical elements) may be associated with a colored line or cone that extends therebetween. The function here is to help the user understand the correlation between the finger contact and the first endpoint 2104(1). This function can also be achieved with other mechanisms.

Figure 22:
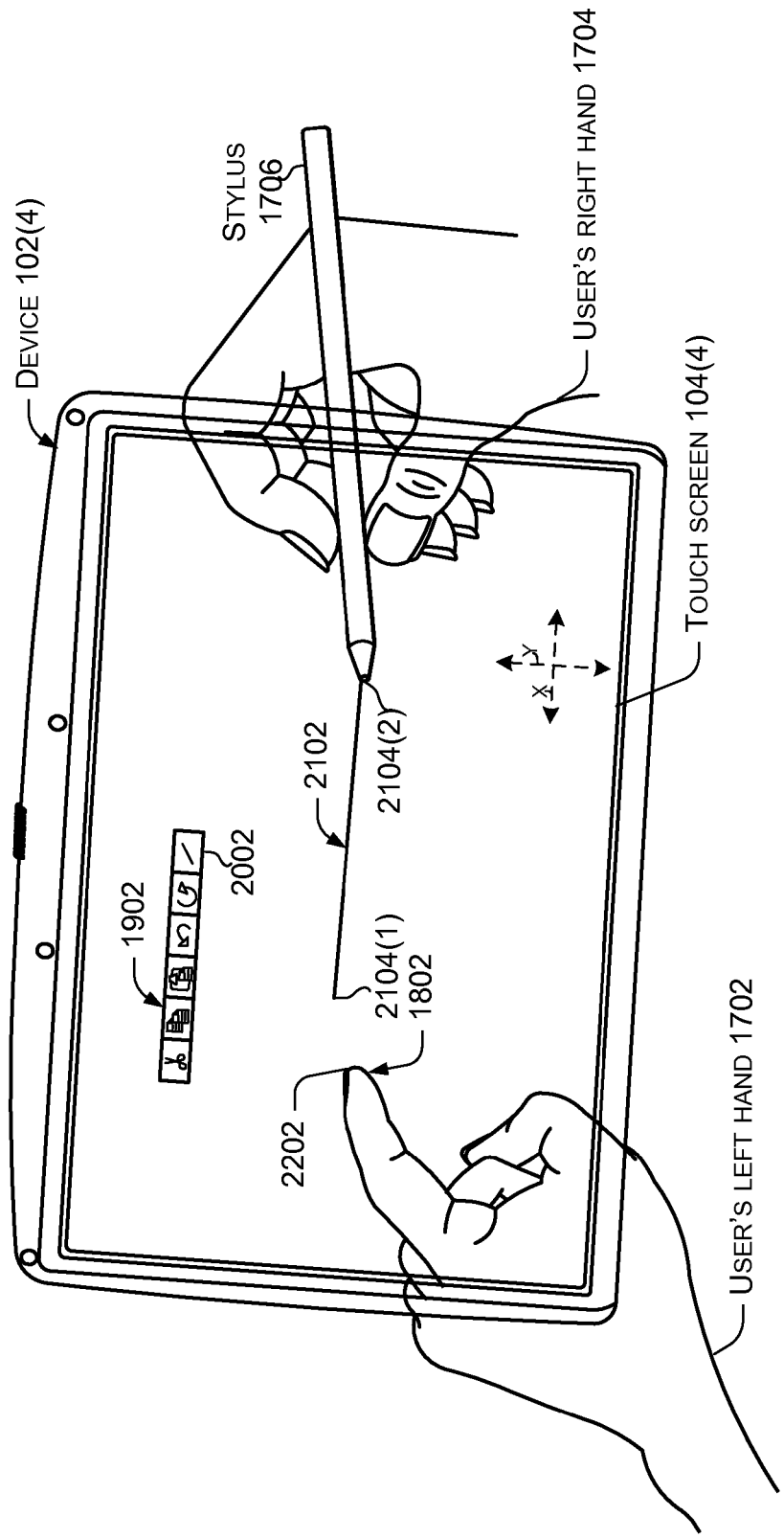

FIG. 22 shows a subsequent view where the user has maintained contact 1802, but 'slid' the contact on the screen to a new location 2202. Correspondingly, the first endpoint 2104(1) of line 2102 has been adjusted to maintain a consistent relative orientation and/or distance to the contact 1802. In some implementations, the first endpoint could be created and maintained directly under the contact 1802. However, in this implementation, the first endpoint 2104(1) is offset from the contact 1802 by some value and the value of that offset is maintained as the user controls the first endpoint 2104(1) by moving the contact 1802. For instance, assume for purposes of explanation, that as shown in FIG. 21, the first endpoint is 10 units in the positive x-direction and 5 units in the positive y-direction from contact 1802. When the user moves contact 1802 to a new location, the first endpoint is automatically moved to maintain the same 10 unit positive x and 5 unit positive y relative orientation.

Figure 23:
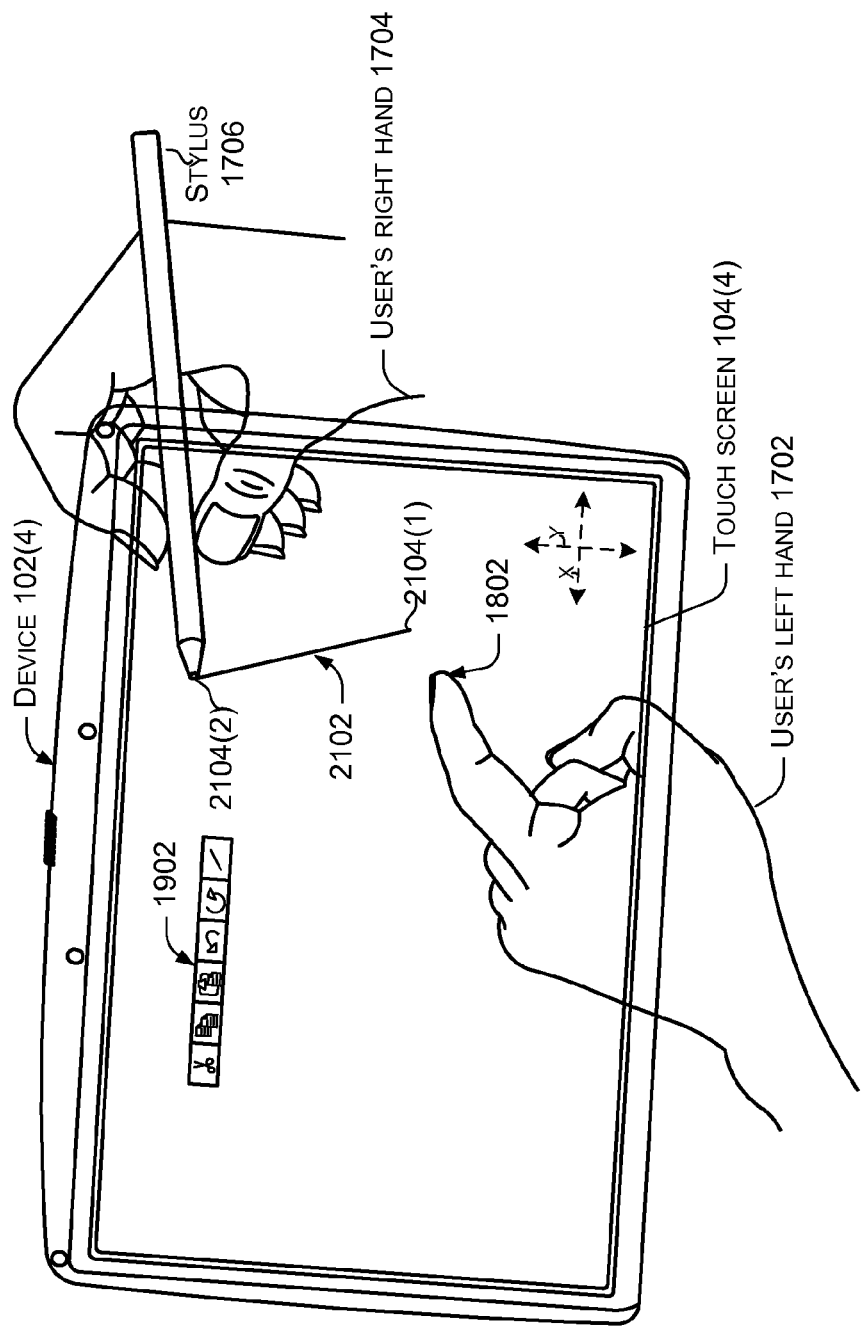

FIG. 23 shows another subsequent view to further aid the reader in understanding how the user can control properties of line 2102 via first and second endpoints 2104(1) and 2104(2). In this case, the user has moved the contact 1802 produced by his/her left index finger generally in the positive x direction. Accordingly, the first endpoint 2104(1) has moved in the positive x direction to maintain the constant orientation and/or distance relative to the contact 1802. The user has also moved the stylus 1706 in the positive (e.g., up) y direction. Accordingly, the second endpoint 2104(2) has moved with and continues to underlie the stylus 1706.

Note that the offset between the location of the contact 1802 and the first endpoint 2104(1) allows the user to control the endpoint without obscuring his/her view behind the finger that is generating the contact. Some implementations can determine where to position the endpoint relative the size of the contact. For instance, for a relatively small contact, such as can be generated by a stylus, the endpoint can be positioned directly under the stylus. For a relatively large contact, such as can be generated by a fingertip, the endpoint can be offset. Thus, such a configuration reduces or avoids the user blocking large amounts of a viewing area of interest with his/her finger. The viewing area of interest can be thought of including portions of the toolbar, the endpoint itself and/or content displayed on the touch screen. In contrast, the stylus is relatively thin and tends to block less of the viewing area of interest. Further, the stylus is a relatively precise pointing instrument that allows the user to precisely define an endpoint. A finger on the other hand is relatively large and imprecise and providing an offset can actually allow the user to control the associated endpoint more precisely than if the endpoint was positioned directly under the user's finger. The above examples utilize one finger contact and one stylus contact. These implementations can also handle substituting another finger contact for the stylus or another stylus contact for the finger contact, among other variations.

The above described offset between the finger contact 1802 and the first line end 2104(1) can result in a situation where the finger contact can reach the edge of the screen before the line does. Some implementations can further refine these instances where the contact 1802 or the first line end 2104(1) approaches the screen edges. For example, one implementation can define the interaction such that if the user drags the finger to the edge of the screen, the mode remains active, and the user can then lift the finger and return to a "handle" that is left at the end of the line to continue dragging it to the screen edge. Such a strategy can also allow the user to interleave additional touch gestures such as panning/scrolling, or pinch-to-zoom, to adjust the view and then again touch the line to continue controlling it.

Please note that in the illustrated example of FIGS. 17-23, toolbar 1902 remains visible and unchanged during the drawing process of FIGS. 21-23. In other implementations, the presentation of the toolbar may be changed in some way during the drawing process. For instance, some degree of transparency may be applied to the toolbar, or the toolbar may be eliminated completely during the drawings process. The toolbar could be restored upon culmination of the drawing process, such as when the user lifts contact 1802 and/or stylus 1706.

Also note that in another implementation, toolbar 1902 could be expanded and controlled by two or more contacts, such as is illustrated and described above relative to FIGS. 11-12 to create an expanded toolbar. For instance, the multiple contacts could be from multiple fingers of the user's left hand. The multiple contacts of the user's left hand could be used to control the first line end 2104(1) of the line while the stylus (or the user's right hand) is utilized to control the second line end 2104(2). The skilled artisan should recognize still other variations that are consistent with the described concepts.

Example Operating Environment

Figure 24:
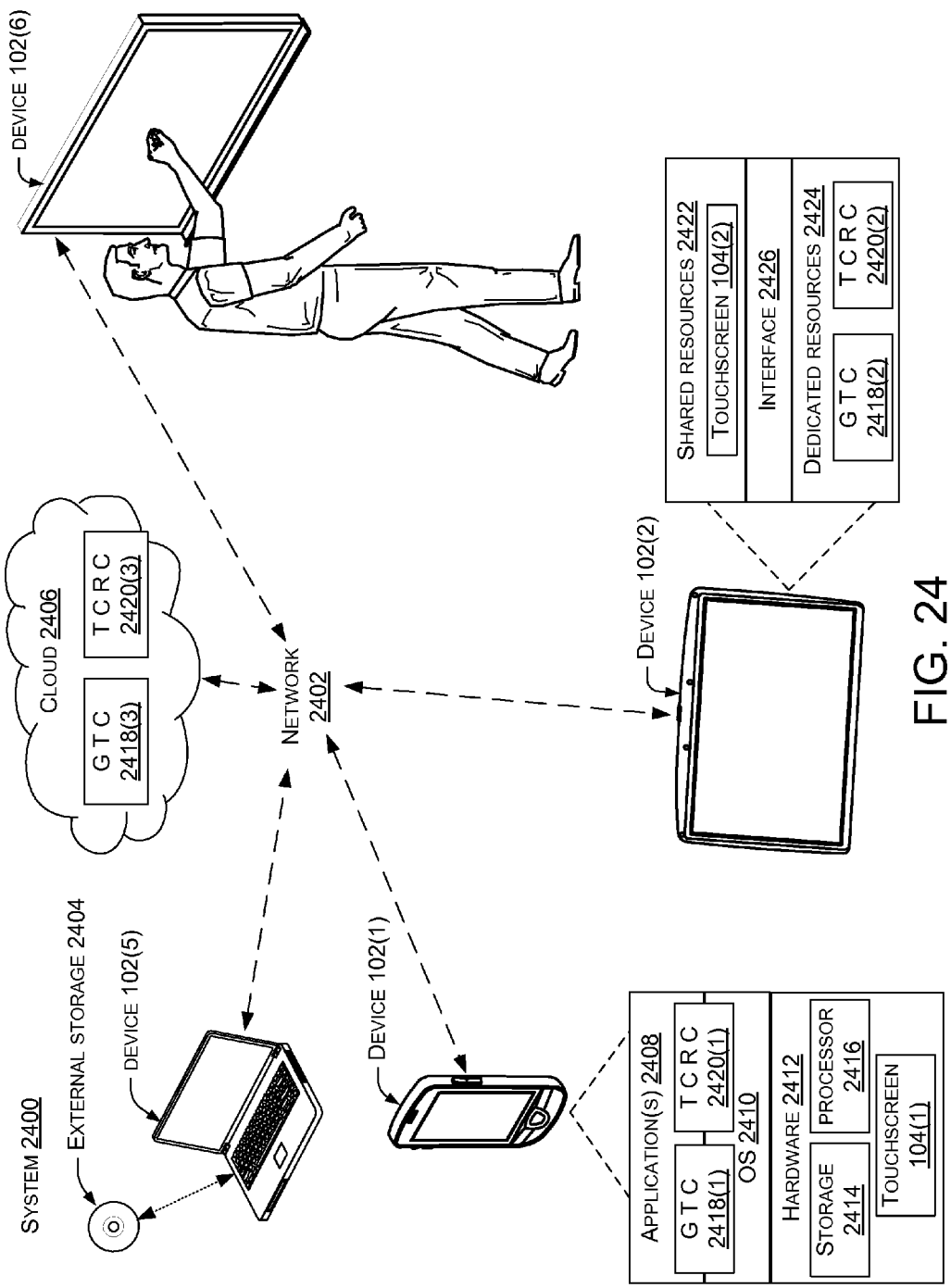
FIG. 24 is an example of a system that can implement touch screen control concepts.

FIG. 24 shows a system 2400 upon which touch screen control techniques can be implemented. For purposes of explanation, four devices 102(1), 102(2), 102(5) and 102(6) are illustrated. In some cases parentheticals are utilized after a reference number to distinguish like elements. Use of the reference number without the associated parenthetical is generic to the element. Devices 102(1) and 102(2) were previously introduced, while devices 102(5) and 102(6) are newly introduced. For sake of brevity, not all of the previously introduced devices are represented here. Instead, examples of several types of devices are illustrated relative to system 2400. Further, for sake of brevity only two of the illustrated devices are described in detail. This description can be applied to other devices. This description is also intended to provide examples of device configurations that can be employed to support touch screen control concepts. The skilled artisan will recognize other device configurations that can support the described touch screen control concepts.

In this case, device 102(1) is manifest as a smart phone type device. Device 102(2) is manifest as a tablet type device. Device 102(5) is manifest as a laptop or notebook computer. Device 102(6) is manifest as a virtual white board where the user can engage the board to control content displayed on the board. The term "device" as used herein can mean any type of device that has some amount of processing capability. While specific examples of such devices are illustrated for purposes of explanation, other examples of such devices can include traditional computing devices, such as personal computers, cell phones, smart phones, personal digital assistants, or any of a myriad of ever-evolving or yet to be developed types of devices. Further, a system can be manifest on a single device or distributed over multiple devices.

Individual devices 102 can exchange data over a network 2402. Alternatively or additionally, data may be exchanged directly between two devices as indicated, such as via a USB protocol or can be exchanged via a storage media or storage 2404. Individual devices can function in a stand-alone or cooperative manner to achieve touch screen control. For instance, part of a functionality offered on a device may be performed on the device and part may be performed on another device and/or in the cloud 2406. As used herein, the cloud 2406 refers to computing resources and/or computing functionalities that can be accessed over network 2402.

A multitude of different configurations can be created to configure a device 102 to accomplish touch screen control concepts. For purposes of explanation, examples of two possible device configurations are described below relative to devices 102(1) and 102(2).

Device 102(1) includes an application(s) 2408 running on an operating system (OS) 2410. The operating system can interact with hardware 2412. Examples of hardware can include storage media or storage 2414, processor(s) 2416, and a touch screen 104(1). Further, a geometry tracking component 2418(1) and a tactile command relation component 2420(1) can function in cooperation with application(s) 2408 and/or operating system (OS) 2410 and touch screen 104(1).

Processor 2416 can execute data in the form of computer-readable instructions to provide a functionality, such as a touch screen control functionality. Data, such as computer-readable instructions can be stored on storage 2414 and/or storage 2404. The storage 2414 can include any one or more of volatile or non-volatile memory, hard drives, and/or optical storage devices (e.g., CDs, DVDs etc.), among others.

The devices 102 can also be configured to receive and/or generate data in the form of computer-readable instructions from storage 2404 that for sake of explanation can be thought of as external storage media. Examples of external storage media can include optical storage devices (e.g., CDs, DVDs etc.), hard drives, and flash storage devices (e.g., memory sticks or memory cards), among others. The devices may also receive data in the form of computer-readable instructions over network 2402 that is then stored on the device for execution by its processor.

Device 102(2) has a configuration that can be representative of a system on a chip (SOC) type design. In such a case, functionality provided by the device can be integrated on a single SOC or multiple coupled SOCs. In this case, device 102(2) includes shared resources 2422 and dedicated resources 2424. An interface(s) 2426 facilitates communication between the shared resources and the dedicated resources. As the name implies, dedicated resources 2424 can be thought of as including individual portions that are dedicated to achieving specific functionalities. For instance, in this example, the dedicated resources include geometry tracking component 2418(2) and tactile command relation component 2420(2). In one case, circuitry on the SOC can be dedicated to the geometry tracking component 2418(2) while other circuitry can be dedicated to tactile command relation component 2420(2).

Shared resources 2422 can be storage, processing units, etc. that can be used by multiple functionalities. In this example, the shared resources include touch screen 104(2). While in this case, geometry tracking component 2418(2) and tactile command relation component 2420(2) are implemented as dedicated resources 2424, in other configurations, either or both of these components can be implemented on the shared resources 2422 and/or on both the dedicated resources 2424 the shared resources 2422.

Geometry tracking component 2418 can be configured to track tactile contacts at locations on touch screen 104. In some configurations, the touch screen can include contact detectors which are coupled to the geometry tracking component 2418. Geometry tracking component 2418 can track the contact detectors and their relative states (i.e. activated or inactivated) on touch screen 104. The geometry tracking component can alternatively, or additionally, track various content displayed on the touch screen, such as graphical windows, icons, etc.

Tactile command relation component 2420 can be configured to correlate tactile contacts detected by the geometry tracking component 2418 to corresponding commands. For instance, the geometry tracking unit can detect two simultaneous contacts on the touch screen that are proximate to one another. The tactile command relation component can attempt to determine user intent associated with the two simultaneous contacts and present commands that correlate to the user intent. For instance, the tactile command relation component may compare a distance between the two simultaneous contacts to a predefined value.

If the distance exceeds the predefined value, the tactile command relation component may cause the content between the two contacts to be enlarged or zoomed. Alternatively, some implementations may zoom content associated with the two contacts where some of the content is not between the two contacts. For instance, the user may make the two contacts on content within a window. The zooming feature may zoom all of the content of the window or just the content between the fingers. Alternatively, if the distance is less than the predefined value the tactile command relation component may present a toolbar proximate the contacts and allow the user to expand the toolbar by sliding the contacts apart.

Also, once some implementations decide the user desires to zoom content (e.g., go into zoom mode) the determination based upon the predefined value may be temporarily suspended to provide the user a full spectrum of zoom features. For instance, once the device is operating in the zoom mode, the user may pinch and expand regardless of the distance between his/her fingers. The determination can be re-instated when the user switches to another mode.

In another configuration, geometry tracking component 2418 can detect a first individual tactile contact on the touch screen 104. The tactile command relation component 2420 can be configured to cause at least one command category to be displayed on the touch screen proximate to the first individual tactile contact. The geometry tracking component can detect a second individual tactile contact proximate to an individual command category. The tactile command relation component can be configured to cause a plurality of commands belonging to the individual command category to be displayed proximate to the second individual tactile contact.

Generally, any of the functions described herein can be implemented using software, firmware, hardware (e.g., fixed-logic circuitry), manual processing, or a combination of these implementations. The term "component" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Example Techniques

Figure 25:
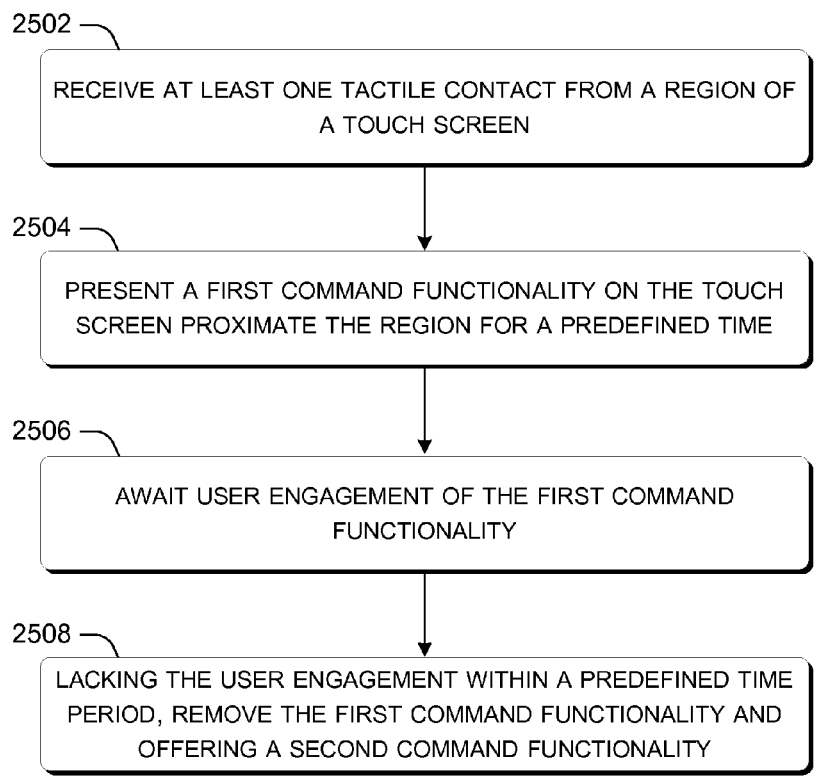
FIGS. 25-26 are flow diagrams of touch screen control methods in accordance with some implementations.

FIG. 25 illustrates a flowchart of a touch screen control technique or method 2500.

Block 2502 can receive at least one tactile contact from a region of a touch screen.

Block 2504 can present a first command functionality on the touch screen proximate the region for a predefined time.

Block 2506 can await user engagement of the first command functionality.

Block 2508, when lacking the user engagement within a predefined time period, can remove the first command functionality and offer a second command functionality.

Figure 26:
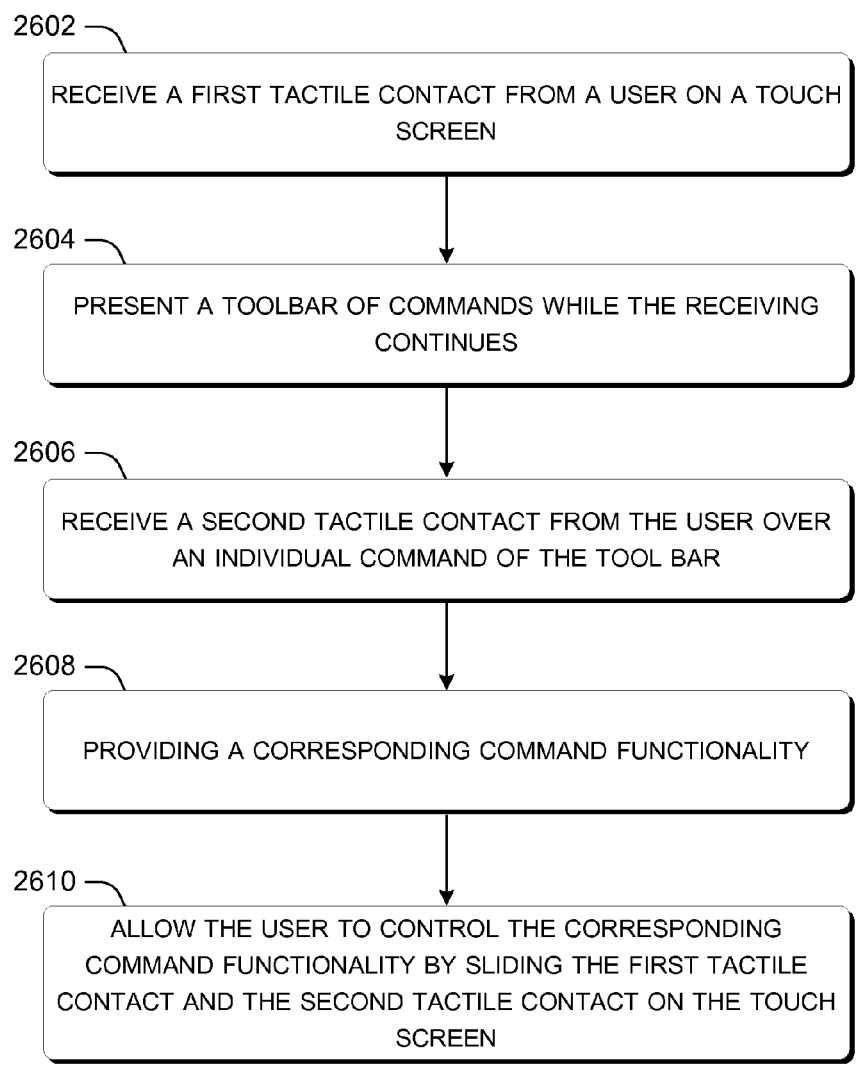

FIG. 26 illustrates a flowchart of another touch screen control technique or method 2600.

Block 2602 can receive a first tactile contact from a user on a touch screen. In some cases, the first tactile contact can be a single tactile contact, such as from a single fingertip. In other cases, the first tactile contact can be multiple substantially simultaneous contacts, such as two, three, or more fingertip contacts from the user's left hand.

Block 2604 can present a toolbar of commands while the receiving continues.

Block 2606 can receive a second tactile contact from the user over an individual command of the toolbar.

Block 2608 can provide a command functionality that corresponds to the individual command selected via the second tactile contact.

Block 2610 can allow the user to control the corresponding command functionality by sliding the first tactile contact and the second tactile contact on the touch screen.

The above described methods detail some exemplary touch screen control techniques. The order in which the above mentioned methods are described is not intended to be construed as a limitation, and any number of the described blocks can be combined in any order to implement the methods, or an alternate method. Furthermore, the methods can be implemented in any suitable hardware, software, firmware, or combination thereof such that a computing device can implement the methods. In one case, the methods are stored on a computer-readable storage media as a set of instructions such that execution by a processor of the computing device causes the computing device to perform the method(s).

The techniques described in the above discussion relate to user control via contacting a touchscreen. These techniques are ideally suited for touchscreen scenarios and can allow user control beyond what is currently available. However, at least some of these techniques offer such an improvement over existing user control techniques that these techniques can be applied to other scenarios that do not include directly contacting a touchscreen or include direct touching in combination with indirect control techniques. For example, in some direct touch/indirect scenarios, one hand of the user can interact with a touch pad, mouse, stylus, or some other transducer, while the user's other hand interacts with the touch screen. In such a case, visual feedback can be provided on the touchscreen for the location of both hands (e.g., contact points from both hands). The user could then expand the toolbar with the accordion motion described above, and then use a signal such as finger pressure to select from the toolbar.

An example of an indirect control scenario can include open-air gestures recorded with a sensor, such as a motion sensor, optical sensor, or data glove. One commercial product that could detect such open air gestures is Kinect® offered by Microsoft Corp. These open air gestures can include the accordion toolbar expansion described above. Other indirect control options can include the use of touchpads, trackballs, and/or joysticks, among others.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented by at least one hardware processor of a computing device, the method comprising:
    receiving a first tactile contact at a first location on a touch screen;
    responsive to receiving the first tactile contact, displaying a toolbar on the touch screen, wherein the first location of the first tactile contact defines positioning of the toolbar on the touch screen and the toolbar includes at least a displayed drawing command for activating a drawing tool and at least one other displayed command for performing other functionality;
    receiving a second tactile contact on the touch screen;
    determining that the second tactile contact identifies the displayed drawing command on the toolbar instead of the at least one other displayed command;
    responsive to determining that the second tactile contact identifies the displayed drawing command, activating the drawing tool;

using the drawing tool, drawing a shape including a first point and a second point on the touch screen, the first point of the drawn shape being defined by the first location that also defines the positioning of the toolbar; and moving the second point of the drawn shape responsive to sliding of the second tactile contact on the touch screen.

2. The method of claim 1, wherein the drawing tool is a line drawing tool, the drawn shape comprises a straight line segment, the first point comprises a first end point of the straight line segment, the second point comprises a second end point of the straight line segment that is opposite the first end point, and the first location of the first tactile contact that defines positioning of the toolbar also defines an initial location of the first end point of the straight line segment.

3. The method of claim 2, further comprising removing the toolbar while a user controls the first end point and the second end point of the straight line segment or making the toolbar transparent or semi-transparent while the user controls the first end point and the second end point of the straight line segment.

4. The method of claim 3, further comprising re-presenting the toolbar when the user stops controlling the first end point and the second end point of the straight line segment and ceasing the re-presenting unless the user engages the toolbar within a predefined time period.

5. The method of claim 1, wherein the first tactile contact is received from a finger and the second tactile contact is received from a stylus.

6. The method of claim 1, further comprising moving the first point of the drawn shape responsive to the first tactile contact sliding on the touch screen away from the first location that defines the positioning of the toolbar.

7. The method of claim 1, wherein the displayed drawing command includes a representation of the drawn shape.

8. A computing device comprising:
a touch screen;
hardware storage configured to store computer-readable instructions; and
at least one hardware processor configured to execute the computer-readable instructions;
wherein the computer-readable instructions, when executed by the at least one hardware processor, cause the at least one hardware processor to:
receive a first tactile contact at a first location on the touch screen;
responsive to the first tactile contact, display multiple different commands on the touch screen wherein the first location of the first tactile contact defines positioning of the multiple different commands on the touch screen, the multiple different commands displayed responsive to the first tactile contact including at least a drawing command and another command;
receive a second tactile contact selecting the drawing command from the multiple different commands displayed on the touch screen; and
responsive to receiving the second contact selecting the drawing command, draw a shape including a first point and a second point on the touch screen, wherein the first point of the drawn shape is defined by the first location that also defines the positioning of the multiple different commands and the second point on the drawn shape is defined by a second location of the second tactile contact.

9. The computing device of claim 8, wherein the computer-readable instructions cause the at least one hardware processor to:
display the first point of the drawn shape offset at a specified distance from the first tactile contact.

10. The computing device of claim 9, wherein the computer-readable instructions cause the at least one hardware processor to:
display a visual cue offset from the first tactile contact at the specified distance.

11. The computing device of claim 10, wherein the computer-readable instructions cause the at least one hardware processor to:
as the first tactile contact is moved on the touch screen, move the visual cue and the first point of the drawn shape on the touch screen while maintaining the specified distance of the visual cue from the first tactile contact.

12. The computing device of claim 11, wherein the visual cue comprises a colored dot of a first color displayed on the touch screen proximate the first point.

13. The computing device of claim 11, wherein the computer-readable instructions cause the at least one hardware processor to:
display another visual cue on the touch screen proximate the first tactile contact and maintain the another visual cue proximate the first tactile contact as the first tactile contact is moved on the touch screen,
the visual cue and the another visual cue being displayed such that the visual cue moves with the first point on the shape and the another visual cue moves with the first tactile contact while the offset is maintained between the visual cue and the another visual cue.

14. The computing device of claim 11, wherein the visual cue is offset from the first tactile contact in both an x direction and a y direction on the touch screen.

15. The computing device of claim 8, wherein the computer-readable instructions cause the at least one hardware processor to:
detect that the first tactile contact has approached an edge of the touch screen;
responsive to detecting that the first tactile contact has approached the edge of the touch screen, display a handle at the first point of the drawn shape; and
responsive to dragging of the handle to the edge of the touch screen, move the first point of the drawn shape to the edge of the touch screen.

16. A computing device comprising:
a touch screen;
a geometry tracking component;
a tactile command relation component; and
at least one hardware processor configured to execute the geometry tracking component and the tactile command relation component,
wherein the geometry tracking component is configured to:
identify a first location on the touch screen where a first tactile contact is received from a user;
wherein the tactile command relation component is configured to:
responsive to the first tactile contact, cause a toolbar to be presented on the touch screen proximate the first location of the first tactile contact, wherein the toolbar has multiple icons including a drawing tool icon for selecting a drawing tool and another icon for selecting other functionality and the first location of the first tactile contact defines positioning of the toolbar on the touch screen;
wherein the geometry tracking component is further configured to:
identify a second location on the touch screen of a second tactile contact received from the user;

wherein the tactile command relation component is further configured to:
- determine that the second tactile contact selects the drawing tool icon from the toolbar; and
- responsive to the drawing tool icon being selected by the second tactile contact, draw a shape on the touch screen, wherein the drawn shape includes a first point and a second point, the first point of the drawn shape being defined by the first location that also defines the positioning of the toolbar and the second point on the drawn shape being defined by movement of the second tactile contact on the touch screen.

17. The computing device of claim 16, wherein the tactile command relation component is further configured to:
- move the first point of the drawn shape responsive to sliding of the first tactile contact on the touch screen.

18. The computing device of claim 16, wherein the second point on the drawn shape co-occurs with the second tactile contact as the second tactile contact is moved on the touch screen.

19. The computing device of claim 18, wherein the first point on the drawn shape is offset from the first location of the first tactile contact.

20. The computing device of claim 19, wherein the first tactile contact is received from a finger and the second tactile contact is received from a stylus.

* * * * *